Figure 1:
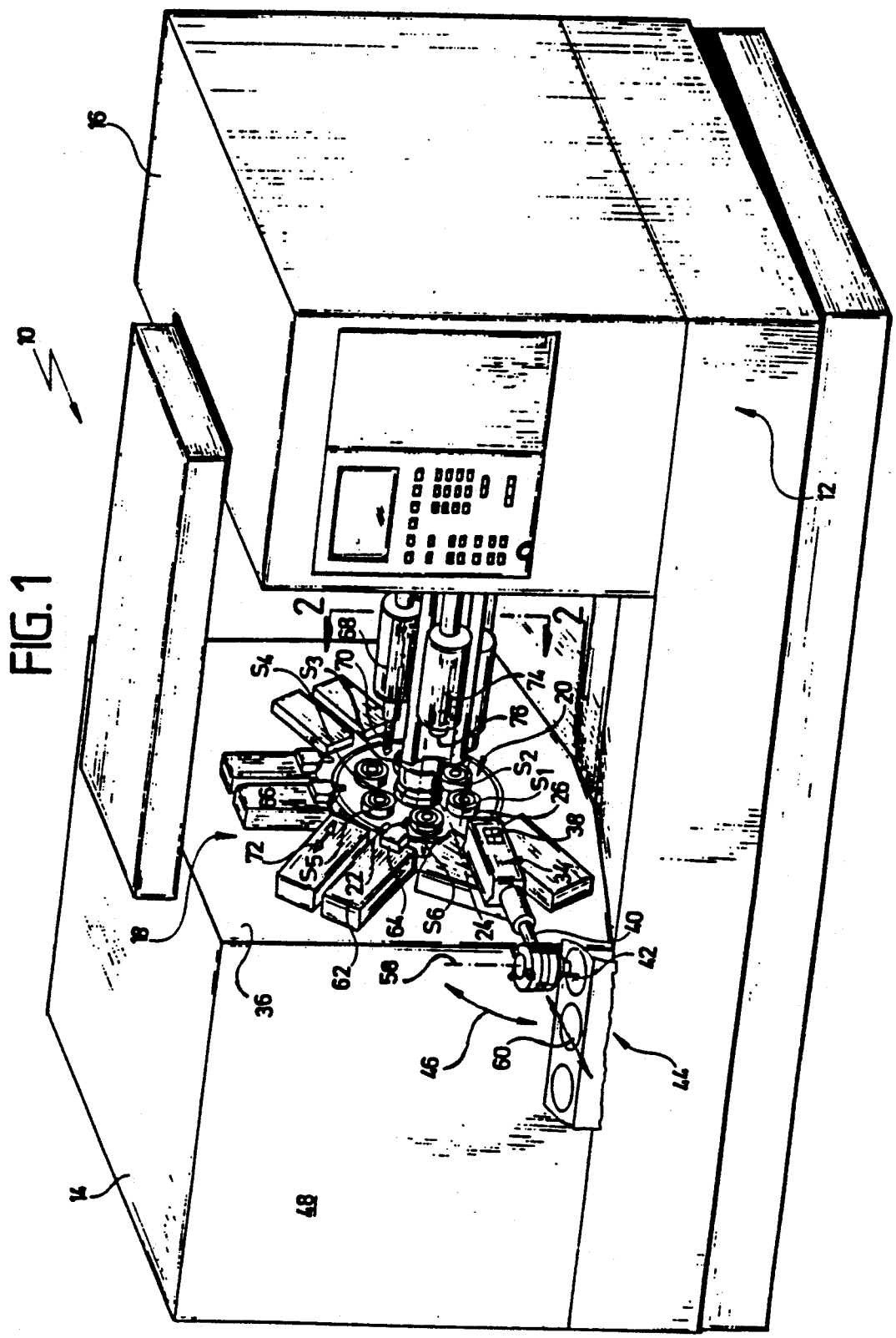

United States Patent [19]
Link et al.

[11] Patent Number: 5,083,485
[45] Date of Patent: * Jan. 28, 1992

[54] METHOD AND APPARATUS FOR MACHINING BOTH SIDES OF WORKPIECES

[75] Inventors: Helmut F. Link, Aichwald; Günther Trautmann, Kirchheim-Nabern, both of Fed. Rep. of Germany

[73] Assignee: Index-Werke GmbH & Co. KG Hahn & Tessky, Esslingen, Fed. Rep. of Germany

[*] Notice: The portion of the term of this patent subsequent to Jun. 4, 2008 has been disclaimed.

[21] Appl. No.: 602,708

[22] Filed: Oct. 24, 1990

Related U.S. Application Data

[63] Continuation of Ser. No. 221,456, Jun. 3, 1988, Pat. No. 5,020,402.

[51] Int. Cl.$^5$ .................. B23B 13/00; B23B 17/00
[52] U.S. Cl. ............................. 82/124; 82/129
[58] Field of Search ............................. 82/129

[56] References Cited

U.S. PATENT DOCUMENTS

| | | | |
|---|---|---|---|
| 4,061,060 | 12/1977 | Trautmann | 82/129 |
| 4,457,193 | 7/1984 | Matthey | 82/129 |
| 4,612,832 | 9/1986 | Ushigoe et al. | 82/129 |

FOREIGN PATENT DOCUMENTS

| | | |
|---|---|---|
| 1264927 | 3/1968 | Fed. Rep. of Germany . |
| 2338207 | 11/1978 | Fed. Rep. of Germany . |
| 2942060 | 4/1981 | Fed. Rep. of Germany . |
| 2951565 | 7/1981 | Fed. Rep. of Germany . |
| 3212268 | 7/1983 | Fed. Rep. of Germany . |
| 3329619 | 3/1985 | Fed. Rep. of Germany . |
| 3333243 | 3/1985 | Fed. Rep. of Germany . |
| 3626326 | 2/1988 | Fed. Rep. of Germany . |
| 659017 | 12/1986 | Switzerland . |
| 936257 | 9/1963 | United Kingdom . |
| 1442598 | 7/1976 | United Kingdom . |
| 2087273 | 5/1982 | United Kingdom . |

OTHER PUBLICATIONS

Article from "*Konstrucktion*", 32 (1980), vol. 9, pp. 345-349.
Article from "*Werkstatt und Betrieb*", 114 (1981), vol. 4, pp. 241-245.

*Primary Examiner*—James G. Smith
*Assistant Examiner*—John A. Mariott
*Attorney, Agent, or Firm*—Kramer, Brufsky & Cifelli

[57] ABSTRACT

In a method and a multiple-spindle automatic lathe for machining both sides of workpieces, in order to increase the number of spindle positions available for machining the workpieces, it is suggested that the spindle drum be indexed in single steps, that the feeding of raw workpieces, the removal of finished workpieces and the changeover of half-finished workpieces be carried out in a single spindle position of the spindle drum and that the feeding of raw workpieces and the removal of finished workpieces occur alternately after each drum indexing.

48 Claims, 12 Drawing Sheets

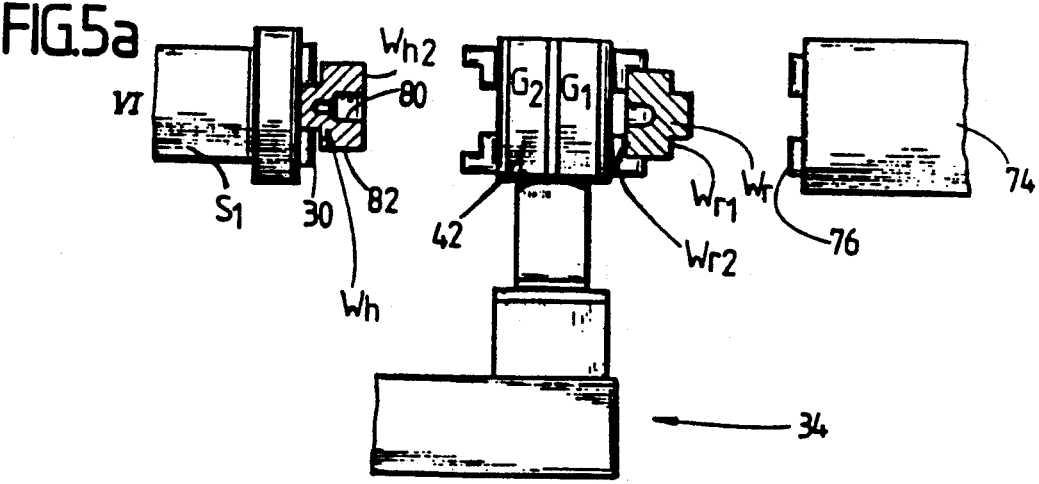
FIG.5a
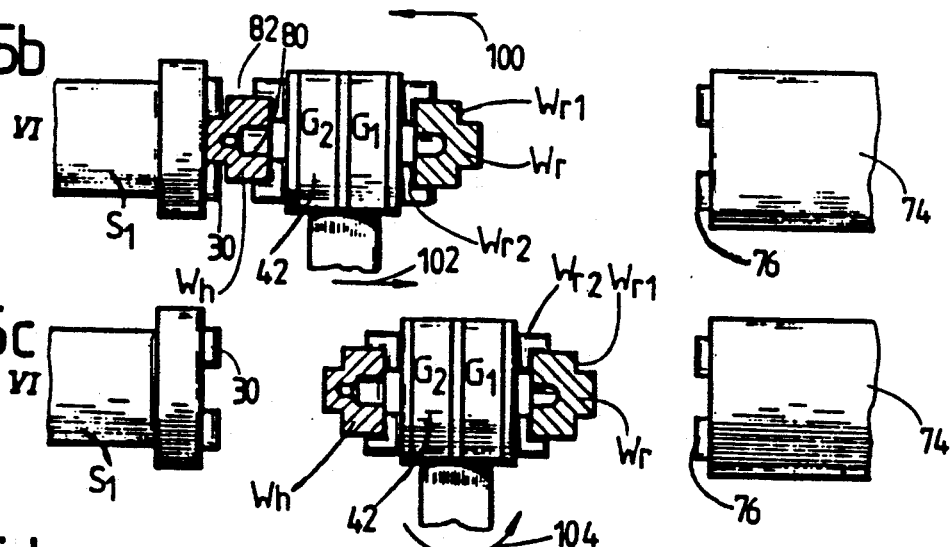
FIG.5b
FIG.5c
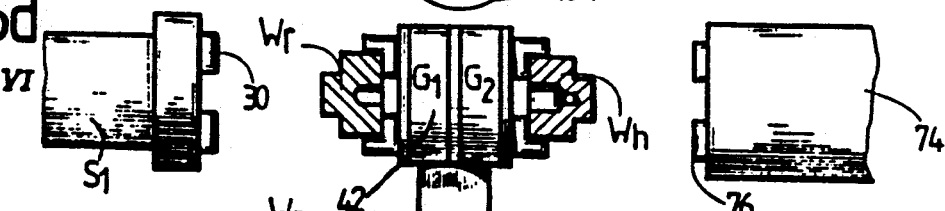
FIG.5d
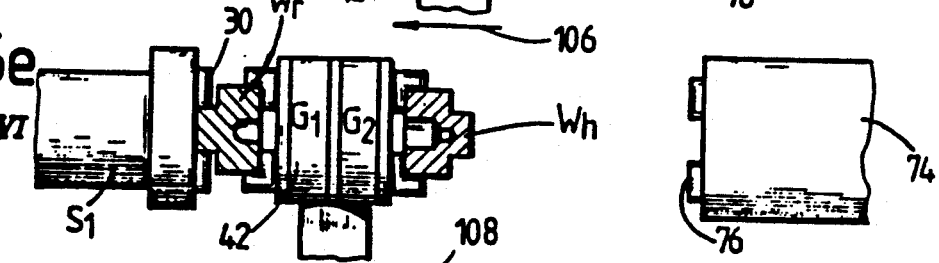
FIG.5e
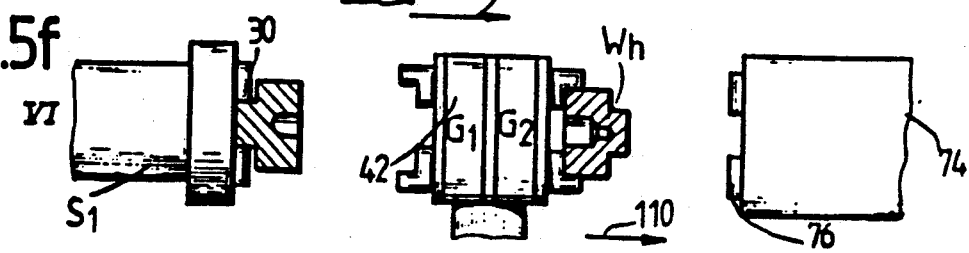
FIG.5f

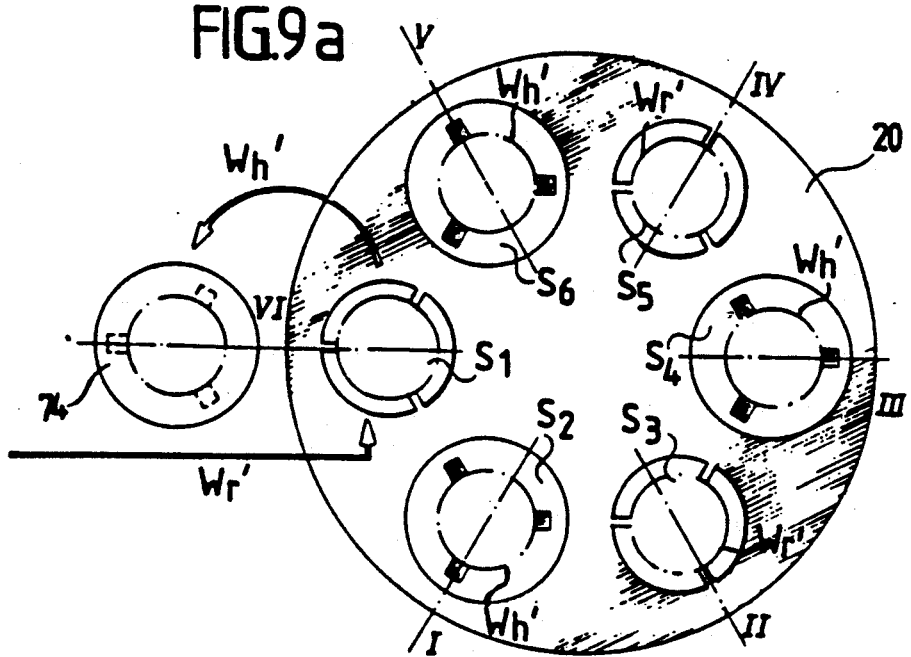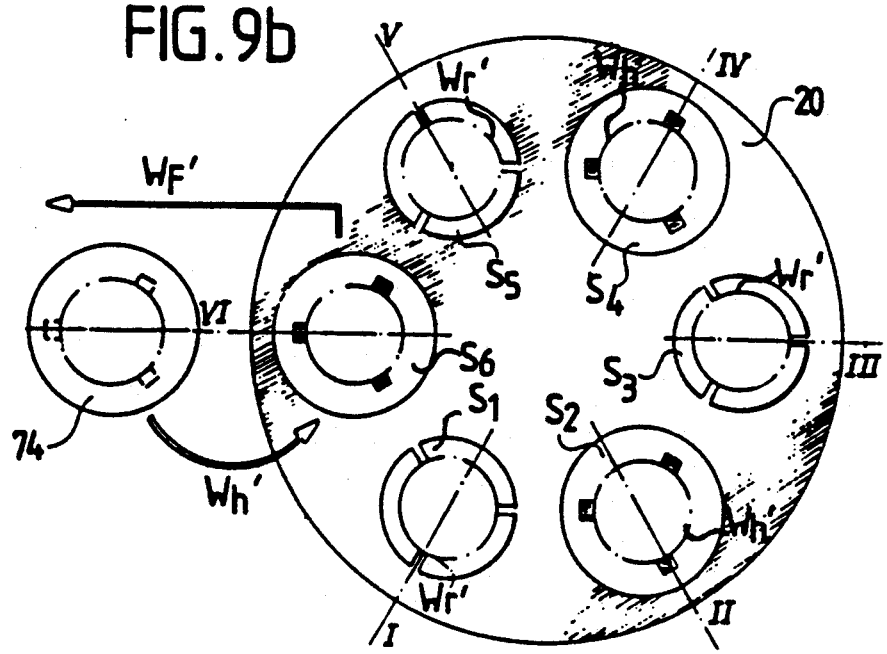

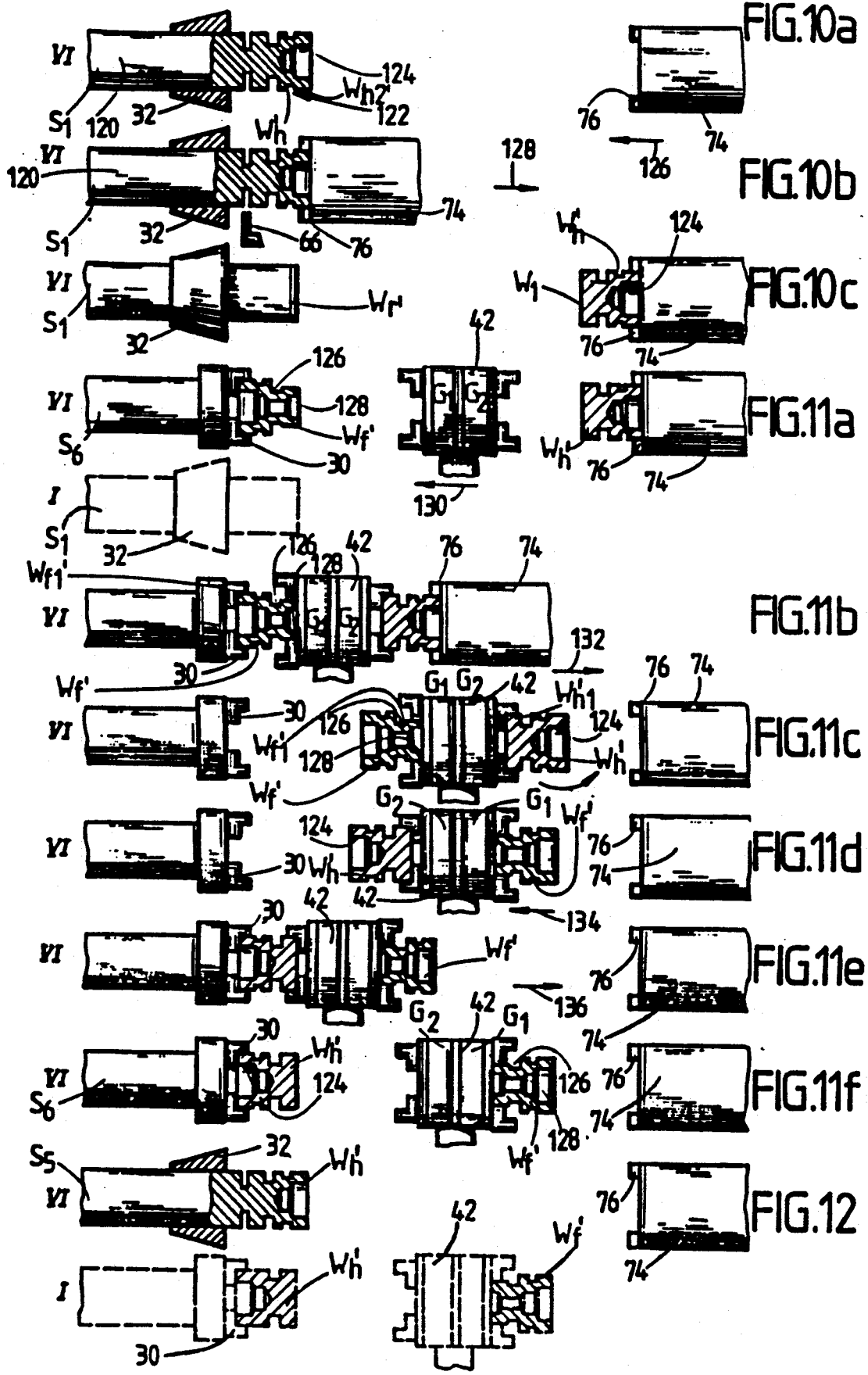

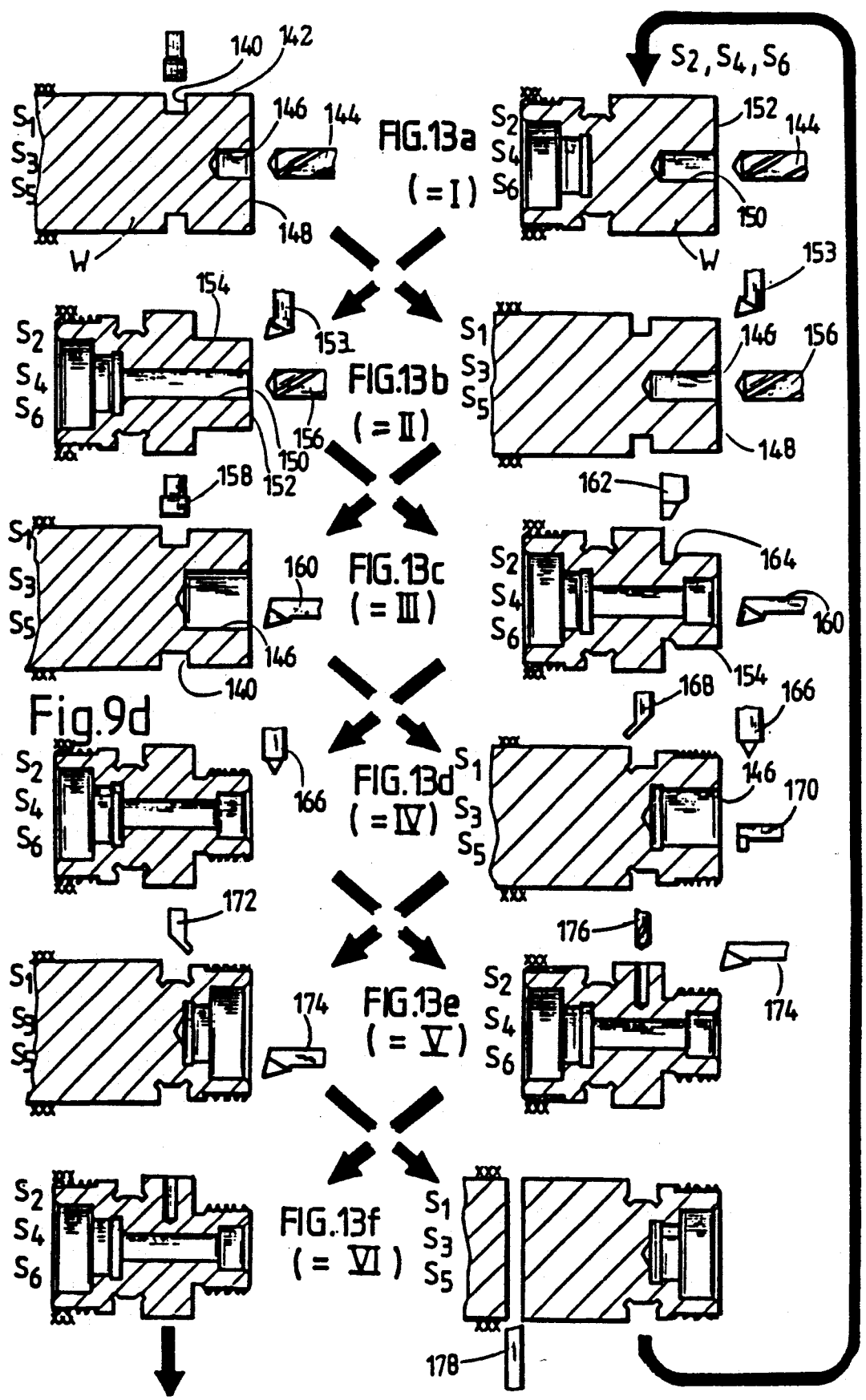

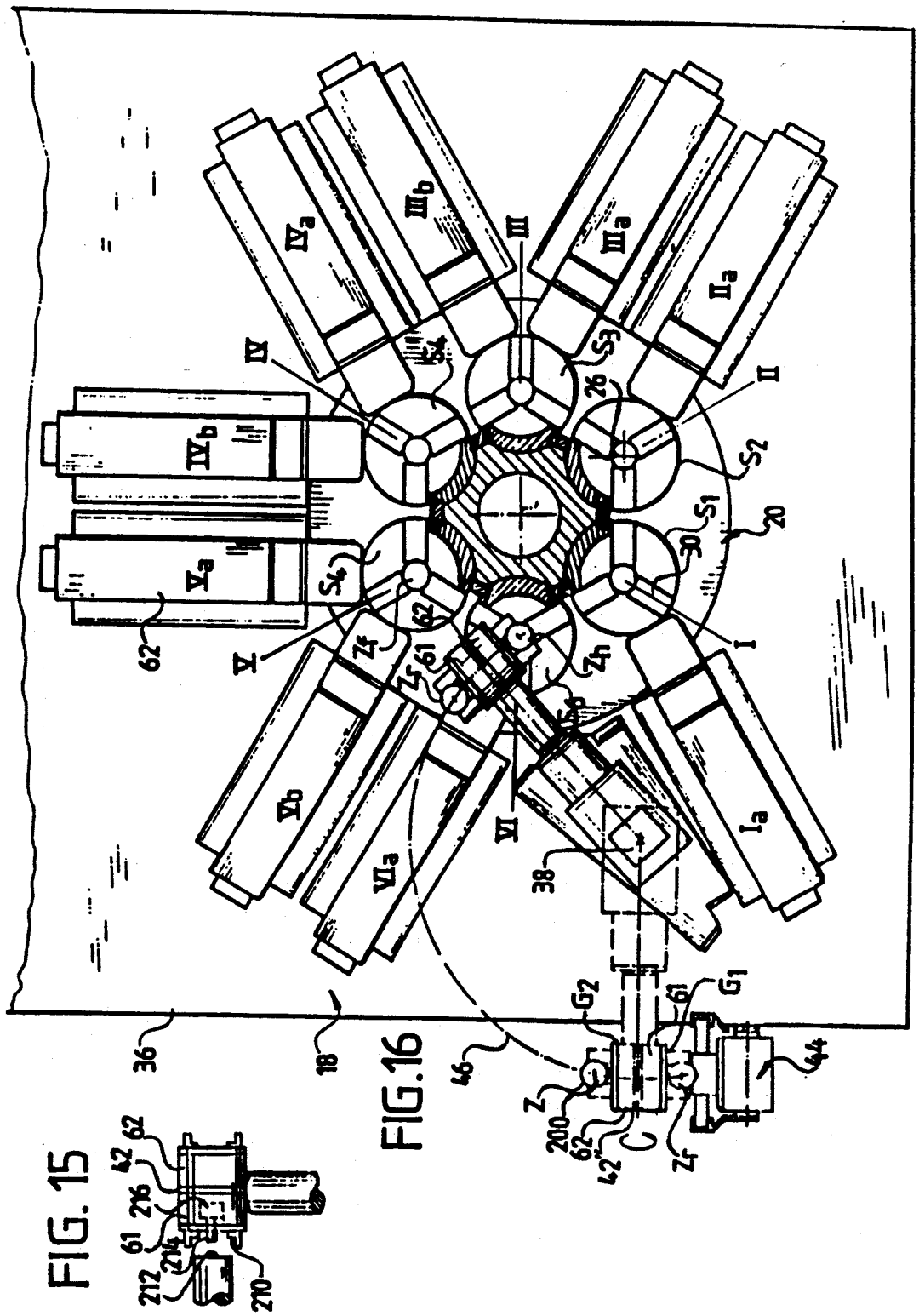

METHOD AND APPARATUS FOR MACHINING BOTH SIDES OF WORKPIECES

This application is a continuation of application Ser. No. 07/221,456, filed June 3, 1988, now U.S. Pat. No. 5,020,402.

The invention relates to a method for machining both sides of workpieces, in which the workpieces are successively clamped in first and second spindles on a first or a second side, respectively, on a spindle drum comprising several spindles, in particular, with spindle axes which are parallel to each other and are arranged at equal angular spacings around a drum axis, and in which raw workpieces are fed to the first spindles, finished workpieces are removed from the second spindles, and half-finished workpieces are changed over from the first to the second spindles, with clamping of the workpieces being simultaneously changed from the first to the second side. The invention further relates to a multiple-spindle automatic lathe for machining both sides of workpieces with a spindle drum which comprises several spindles and on which successive first and second spindles are provided for clamping the workpieces on a first or second side, respectively, with a feeding means for raw workpieces, with a conveying away means for finished workpieces, with a workpiece gripping device and with a workpiece holding device which is associated with the workpiece gripping device and which together with the workpiece gripping device forms a handling unit for changing over the half-finished workpiece from the first to the second spindle, with the clamping of the workpiece being simultaneously changed from the first to the second side.

The machining of a turned part on a first and a second side, i.e., in particular, a front and a rear side, in a machining cycle is already known in multiple-spindle automatic lathes. The Gildemeister publication GM 030 3 Bu 1076 d describes on page 40 a six-spindle automatic lathe with a spindle drum in which three successive spindle positions are used for machining the front side of a chucked part and three further successive spindle positions for machining a rear side. Herein the machining of the chucked parts is to be carried out in such a way that the chucked parts are inserted in one spindle position into the spindle drum, then first pass through the three spindle positions for machining the front side, are subsequently changed over prior to machining of the rear side, then pass through the three spindle positions for machining the rear side and finally after completion of machining of the rear side are conveyed away as finished parts.

Herein the feeding means for raw workpieces is associated with the first spindle position for machining the front side of the chucked parts so raw workpieces are always inserted into the spindles standing in this spindle position and are clamped by these spindles on their first side. By indexing spindle drum one spindle position or one step, in each case, the inserted raw workpieces with the spindles clamping them pass through all three spindle positions for machining the front side. Prior to machining the rear side, the workpieces are to be changed over in such a way that they are clamped on the second side. This is possible either in the last spindle position for machining the front side or in the first spindle position for machining the rear side. To this end, the workpieces are removed from the spindle clamping them on their rear side, reversed and put back into the same spindle which must now clamp the workpieces on their front side which has already been machined. After passing through the three spindle positions for machining the rear side, the finished workpieces are transferred in the last spindle position for machining the rear side to the conveying away means for the finished workpieces.

In this apparatus described above, the spindles can only be equipped with such clamping means as allow simultaneous clamping of the chucked parts on the front and on the rear side. This may cause difficulties even with conventional parts as it is not always possible to clamp a part both on the first side and on the second side with the same clamping means.

Also, there is only a small number of spindle positions available for machining the workpieces since one spindle position for feeding raw workpieces, one spindle position for conveying away finished workpieces and one spindle position for reversing the parts usually have to be provided. In particular, the spindle positions for feeding and conveying away the workpieces are usually not available for machining. Therefore, at the most two spindle positions are left for machining each workpiece side, and reversal of the workpiece also has to be carried out in one of these spindle positions.

Also described in the Gildemeister publication GM 030 3 Bu 1076 d, page 40, is a second possibility for machining a workpiece on a first and a second side, but with an eight-spindle lathe. Herein, the eight spindles are likewise arranged on a spindle drum, and the individual spindles are numbered 1 to 8 in accordance with their order. Spindles 1, 3, 5 and 7 are provided for machining the front side and hence are also equipped with suitable clamping means for clamping the workpiece on the rear side. The even-numbered spindles 2, 4, 6 and 8 are provided for machining the rear side and are equipped with suitable clamping means for clamping the workpieces on the front side. Hence the workpieces are successively clamped on the spindle drum alternately with either their front side or their rear side so the respective other side is available for machining. A total of eight spindle stations fixed on the housing are associated with this spindle drum. In the described method, the spindle drum is indexed one double step, in each case, so only the spindles characterized by an even number pass only the spindle stations bearing an even number, whereas the spindles bearing an uneven number, in turn, pass only spindle stations bearing uneven numbers. Two adjacent spindle stations are used to feed the raw workpieces and convey away the finished workpieces and to simultaneously change over by means of a reversing device the half-finished workpieces from the even-numbered to the uneven-numbered spindles or vice versa.

Accordingly, with such an automatic multiple-spindle lathe, raw parts are, for example, inserted, in each case, into the uneven-numbered spindles in spindle position 1 and in a one-time machining cycle with double-step indexing are machined, in each case, in spindle positions 3, 5 and 7 and arrive again as half-finished parts in spindle position 1. There, at the same time as a new raw part is inserted into this spindle, they are changed over by means of a reversing device to the adjacent spindle standing, for example, in spindle position 2 and in this spindle pass through all even-numbered spindle positions 4, 6 and 8 so as to arrive again as finished parts in spindle position 2 and be conveyed away from there.

In this method, after each double-indexing step, before the next one, a finished part is removed from a spindle standing in spindle position 2, a half-finished part removed from the spindle standing in spindle position 1, fed to the reversing device, a half-finished part removed from the latter and inserted into the spindle standing in spindle position 2 and, finally, a raw part fed to the spindle standing in spindle position 1.

The advantage of this method and this apparatus is to be seen in the fact that each spindle has only to clamp the workpiece on the front or the rear side and hence can be equipped with a suitable clamping means. However, there still remains the problem that on account of the double-step indexing, only half of the spindle positions is available, in each case, for machining the front side or for machining the rear side, and one spindle position is usually reserved, in each case, for the feeding, conveying away and changing over devices. Hence with the eight-spindle lathe, only three spindle positions are available, in each case, for the front and rear side machining. There is the further difficulty that on account of the spindle positions being adjacent to one another, handling of the workpieces is impeded as it is extremely difficult to arrange a feeding means for raw parts, a conveying away means for finished parts and also a reversing and changing over device when two spindle positions are located adjacent to each other.

The object underlying the invention is, therefore, to so improve a method of the generic kind that the number of spindle positions available for machining the workpieces is increased.

This object is accomplished, in accordance with the invention, in a method of the kind described at the beginning by the spindle drum being indexed in single steps and by at least one first spindle position of the spindle drum being provided in which both the feeding of raw workpieces, the removal of finished workpieces and the changing over of half-finished workpieces is carried out in one single spindle position of the spindle drum and in which the feeding of raw workpieces and the removal of finished workpieces occur alternately after each drum indexing.

The inventive solution simultaneously offers several advantages. Only one spindle position is required for feeding, conveying away and changing over the workpieces, which, therefore, already increases the number of spindle positions available for machining the workpiece. Furthermore, owing to only one access to a spindle position being required, the handling device may be of simple and compact design, which with respect to the multiple-spindle automatic lathes known from the prior art with several feeding, conveying away and changing over devices, results in a noticeably simpler design and also a substantially simplified control of the automatic lathe. Also, the number of spindle positions available for each workpiece is more than doubled since each workpiece passes each spindle position and can, therefore, also be machined in each spindle position. For example, with a six-spindle lathe operating according to the inventive method, the raw part can be machined in at least five spindle positions until it arrives again in the sixth spindle position from which it is changed over from the first spindle to one of the second spindles and similarly passes through five spindle positions again in which machining is possible. For reasons of clarification only, reference is made again at this point to the methods according to the prior art in which only half of the spindle positions is available for machining the front or rear side, whether, as in the first case, front side machining be carried out in the first three spindle positions and rear side machining in the second three spindle positions or double-step indexing be used, in which case each spindle position is approached by either the first spindles or the second spindles. In addition to this, there are the further disadvantages of the prior art which result from at least two spindle positions usually being blocked by a feeding and a conveying away device. In the case of a six-spindle lathe, this usually leads to only two spindle positions being available for machining the front side and two spindle positions for machining the rear side. This increase in the number of spindle positions available for machining a workpiece is highly advantageous, above all, in the case of complex parts on which a large number of machining steps have to be carried out since the number of machining tools which can be associated with a spindle position, for space reasons alone, cannot be indefinitely increased, and so normally a maximum of three tools which are movable independently of one another can be associated with each spindle position. Hence with the inventive solution, a maximum of five times three, in each case, i.e., fifteen tools can be used for machining the front and rear side, whereas in the methods according to the prior art, it is a maximum of two times three, in each case, i.e., six tools.

Finally, a further achievement made with the inventive method is that only workpieces can be inserted with their first side into the first spindles and only workpieces with their second side into the second spindles so the respective clamping means can be adapted to the first and second sides of the workpieces.

The above-described method is—as already explained at the beginning—superior, in particular, when workpieces are to be machined which require a plurality of machining steps. In the machining of "simpler" workpieces, i.e., such as require less machining steps, the inventive method would not be used in an optimal manner. For this reason, provision is made in a further embodiment of the inventive method for at least one second spindle position of the spindle drum to be selected in which both additional feeding of raw workpieces, additional removal of finished workpieces and additional changing over of half-finished workpieces is carried out and in which the feeding of raw workpieces and the removal of finished workpieces are carried out alternately after each drum indexing. In this way, optimal use is also made of the possibilities offered by the inventive method with the "simpler" workpieces and so with these simple workpieces approximately a doubling of the piece numbers is possible as compared with the first embodiment.

The two spindle positions according to the further embodiment can be advantageously selected in accordance with the number of machining stations required for the workpieces and the further workpieces. In the simplest case, these are so selected that they lie on opposite sides of the spindle drum, i.e., in particular, in mirror-image relation with respect to an axis of rotation of the spindle drum.

In the above-described methods, it was not specified how the changeover of a workpiece from the first to the second spindles and hence also the change in the clamping from the first side to the second side are to be carried out. One skilled in the art is familiar with a large number of measures for this purpose. The simplest changeover possibility is for the changing over to include several transferrals of the workpiece, i.e., for the workpiece arriving on a first spindle in the spindle position provided for the changeover to be transferred to several workpiece gripping devices until the second side of this workpiece can after indexing of the spindle drum be clamped by a second spindle arriving in the spindle position provided for the changeover.

So long as the changeover includes only transferral of the workpiece without reversal of a workpiece holding device, i.e., when chuck-type or end face grippers are used as grippers, it is necessary for the changeover to include an uneven number of transferrals of the workpiece, in which case the workpiece is gripped on the opposite side during transferral. Due to the uneven number of transferral steps, the clamping of the workpiece is automatically changed from the first to the second side.

Instead of the uneven-numbered transferral during changeover, it is, however, similarly possible for the changeover to include reversal. In this case, it is no longer necessary for an uneven number of transferrals to be carried out. Here, it is conceivable to provide, for example, a separate reversing device, or a radial gripper for reversing the workpiece may also be provided on the workpiece gripping device.

In order to lose as little time as possible during changeover, it is advantageous for the changeover to be carried out in a working area of the machine tool so as to move the workpiece over distances which are as short as possible and thereby save as much time as possible.

On the other hand, it may be avantageous, if, for example, a machining step is also to be carried out in the spindle position provided for the changeover, for the reversing to be carried out outside of the working area in order to prevent contamination of the workpiece by chips. However, this may also prove necessary if chips occurring in the working area are difficult to remove from the workpiece and a chip should, under no circumstances, be clamped in when clamping on the second side is effected. With this type of procedure, it is, for example, also possible to clean the workpiece thoroughly during reversal outside of the working area.

Within the scope of the above statements, it was explained in which steps the changeover is to be expediently carried out, but nothing was said about how the changeover is to be advantageusly carried out in the quickest and simplest manner since in the inventive solution it is, above all, a question of keeping the times required for the individual operations according to the inventive method as short as possible. For this reason, it is particularly advantageous within the scope of the inventive solution to use for the changeover a workpiece gripper which is rotatable through 180 degrees about a (\*) transversely to a spindle axis and which operates very quickly and efficiently during changeover of the clamping of the half-finished workpiece.

\* axis extending

Hence, for example, in a variant of the inventive method using the above-mentioned workpiece gripper, the changeover of the half-finished workpiece in the selected spindle position is carried out in the working area in such a way that the half-finished workpiece is removed from the spindle by means of the workpiece gripper, the workpiece gripper is rotated through 180 degrees, and the workpiece is transferred in a workpiece holding device displaceable in the axial direction towards the spindle and is inserted by the workpiece holding device into the spindle which after indexing is standing in the selected spindle position. Accordingly, in this variant of the inventive method, the changeover is carried out in such a way that the half-finished workpiece is gripped on the machined side by the workpiece gripper and is transferred to the workpiece holding device in such a way that the latter grips it on the side which is not yet machined and it is inserted by the workpiece holding device into the spindle after indexing of the spindle drum, in which case the workpiece is clamped on the machined side and so the side which was not machined first is now free to be machined. This changeover method carried out in the working area is extremely time-saving, in particular, when the workpiece holding device is aligned coaxially with the spindle so when the workpiece is transferred from the spindle to the workpiece holding device, only motions in the coaxial direction of the spindle are necessary in addition to the rotation about the axis transversely to the spindle axis.

As an alternative to the above-described variant, a further variant of the inventive method makes provision for the changeover of the half-finished workpiece in the selected spindle position to be carried out in the working area in such a way that the half-finished workpiece is removed by means of a workpiece holding device displaceable in the axial direction towards the spindle, transferred to the workpiece gripper which is rotated through 180 degrees and inserted by the latter into the spindle which after indexing is standing in the selected spindle position. This variant can be carried out just as quickly as the variant described above and differs from it only in that the half-finished workpiece is removed from the spindle by the workpiece holding device. This variant is expedient particularly if bar stock is being machined, as will be explained in detail below.

The above-described variants are used, in particular, when the half-finished workpiece is gripped by the workpiece gripper axially, i.e., for example, at the front or end face.

In a further variant of the inventive method which is used, in particular, with shaft-type parts, provision is made for the changeover of the half-finished workpiece in the selected spindle position to be carried out in the working area in such a way that it is gripped in the radial direction, is removed from the first spindle standing in the selected spindle position, and remaining in the working area, is reversed by a 180 degree rotation of the workpiece gripper and after removal of the finished workpiece clamped in the second spindle in the selected spindle position due to indexing of the spindle drum, the half-finished workpiece is inserted into the second spindle. Accordingly, in this variant of the inventive method, transferral of the half-finished workpiece to an additional workpiece holding device is not necessary since the workpiece, for example, a shaft-type part, can be gripped in the radial direction, in particular, in a central region thereof, and after rotation of the workpiece gripper through 180 degrees, can be inserted with the already machined side, after indexing of the spindle drum, into the next spindle.

In this variant of the inventive method, too, the great advantage lies in the fact that the changeover of the half-finished workpiece can be carried out in such a way that it need not leave the working area and, consequently, very short changeover times can be achieved.

As a supplement to the variants of the inventive method described so far, in which only the changeover of the half-finished workpiece was explained in detail, it is, furthermore, expedient, in particular, in order to save valuable time, for a double gripper to be used as workpiece gripper and for the finished workpiece to be removed from the spindle standing in the selected spindle position and taken away out of the working area. This inventive method has the additional advantage that, in contrast with the prior art in which the finished workpiece is, for example, dropped and caught, no additional device is required for catching the workpiece and, in addition, the finished workpiece can be transferred in a defined position to, for example, a workpiece transporting device by means of the gripper.

In the possibilities of the inventive method described so far, it was not specified how the workpiece is fed to the first spindles. With certain parts, it is, for example, possible for the raw workpiece to be fed coaxially with the first spindles, i.e., it is pushed, for example, in the form of bar stock coaxially through the spindle so there is no necessity for either the gripper to perform additional operations or for an additional device for insertion of the workpiece to be provided in the working area.

In the case of such coaxial feeding of the raw workpiece, in order that it can be advanced, i.e., that the workpiece can be pushed out of the spindle to a defined extent, an additional stop must be provided for the workpiece to be pushed thereagainst. It is, therefore, particularly simple and time-saving if the workpiece gripper is used as delimiting stop in the coaxial feeding of the raw workpiece so the workpiece gripper need not insert this workpiece and provision of an additional stop is unneccessary.

In all the cases in which the workpiece cannot be fed coaxially with the first spindles, provision is made in the inventive method, in particular, again to save time and to achieve a method performance which is as simple as possible, for the raw workpiece to be brought into the working area and inserted into the first spindle standing in the selected spindle position by the double gripper.

Even in the simplest embodiment of the inventive method in which provision is made for the workpiece to be machined in several spindle positions with the exception of that spindle position provided for the feeding, removing and changing over, the advantages described at the beginning as regards the availability of spindle positions for machining are gained. This need not necessarily be all of the spindle positions. It is, for example, also possible for only the machining of one side to be carried out in one spindle position with a tool combination which is not suitable for the other side. By one spindle position being reserved for the feeding, removing and changing over, problems regarding contamination of all of the workpiece clamping and gripping devices by chips, which may result in damage to the workpiece, are avoided in a simple manner.

On the other hand, it is, however, necessary and also desirable in many cases for the workpiece to be machined in the spindle position provided for the feeding, removing and changing over, which, for example, will only be the case when the machining time for a part must be optimized since all of the handling operations usually take substantially less time than the cutting operations to be performed after each indexing of the spindle drum, and so the time available in the spindle position provided for the feeding, removing and changing over is usually not completely exhausted by the handling operations, which wastes valuable machining time. Hence, for example, a last finish-turning of the workpiece can be carried out without any difficulty in the spindle position provided for the feeding, removing and changing over.

Machining of the workpiece in the spindle position provided for the feeding, removing and changing over is also always necessary when the workpiece is cut off during the changing over. This will always be the case when bar stock is used as starting material for the workpieces and when, for example, on account of the required surface precision, it is necessary for the part to be machined in one clamped state only throughout its entire length.

For the cutting-off operation, it is necessary for the workpiece to be held rotatingly by the workpiece gripper or by the workpiece holding device.

The workpiece can be cut off in a particularly clean and precise manner if it is held synchronously during the cutting-off operation so the burr which is usually produced by the cutting-off does not occur. Also, the synchronous holding of the workpiece during the cutting-off operation may simultaneously constitute a first transferral of the workpiece for changeover so the cutting-off operation is already integrated into the changeover and hence the changeover can be carried out substantially quicker.

A further object of the invention is to so improve a multiple-spindle automatic lathe of the generic kind that performance of the above-described method is possible with it.

This object is accomplished, in accordance with the invention, with a multiple-spindle automatic lathe of the kind described at the beginning by the spindle drum being indexable in single steps, by providing a single spindle position of the spindle drum with which the feeding means for raw workpieces and the conveying away means for finished workpieces alone or in combination with the workpiece gripping device as well as the handling unit are associated with respect to function, and by either raw workpieces being fed or finished workpieces being conveyed away alternately after each indexing of the spindle drum.

This inventive multiple-spindle automatic lathe has the same advantages as the above-described method. In addition, it should be mentioned that the inventive multiple-spindle automatic lathe may be of simpler design and hence also constitutes a more economically priced solution owing to the fact that only one workpiece gripping device is required.

In the case of "simple" workpieces, in order make optimal use of the possibilities of the inventive multiple-spindle automatic lathe, it is particularly advantageous to provide at least a second spindle position of the spindle drum with which both a further conveying away means for raw workpieces and a further conveying away means for finished workpieces alone or in combination with a further workpiece gripping device as well as a further handling unit are associated with respect to function, and in which either raw workpieces are fed or finished workpieces are conveyed away alternately after each indexing of the spindle drum.

The arrangement of the spindle positions can, in principle, be adapted to the machining steps required for the respective parts. The spindle positions are advantageously arranged opposite one another, in particular, in such a way that they are accessible from opposite sides of the multiple-spindle automatic lathe.

In the embodiments described so far, the design of the workpiece gripping device was not referred to in greater detail. It is advantageous, particularly in order to achieve very short times for changeover of the workpiece, for the workpiece gripping device to comprise a workpiece gripper which is rotatable about an axis extending transversely to the spindle axis. With such a workpiece gripper, as already explained in conjunction with the method, the half-finished workpiece can be changed over very efficiently and quickly.

In order to rotate this gripper through 180 degrees without having to take it out of the working area, which likewise costs valuable time, a working area of the multiple-spindle automatic lathe is expediently designed in such a way that the workpiece gripper with at least one workpiece gripped therein is rotatable about the axis extending transversely to the spindle axis.

Since it is a question of the workpiece in the tool gripper being able to be swivelled through 180 degrees during changeover, it is expedient for the workpiece gripper to be immobilizable in two positions oriented parallel to the spindle axis and arranged in rotated relation to each other through a rotary angle of 180 degrees with respect to the axis extending transversely to the spindle axis, i.e., for the workpiece gripper, in the simplest case, to be exactly positionable in these two positions and for a drive to be provided for transferring it from the one to the other position. In embodiments of the inventive solution in which further rotated positions of the gripper are necessary, it is, however, also conceivable for the gripper to be rotatable into any chosen angular positions and immobilizable in these.

In particular, to enable rotation of the workpiece gripper through 180 degrees, in a simple manner, in accordance with the last mentioned embodiments, it is expedient for the workpiece gripping device to comprise an arm which follows the workpiece gripper and is rotatable about its longitudinal axis. However, this does not exhaust all of the movement possibilities of the arm within the scope of the invention. For example, if both grippers lie on the same side, it may be necessary for the arm to also be displaceable in its longitudinal direction.

In the above-described inventive solution of a multiple-spindle automatic lathe, the appearance of the workpiece gripping device was not specified. It is, for example, expedient for the workpiece gripping device to comprise a double gripper in order that it can carry out changeover of the workpiece in as short a time as possible. Several possibilities are conceivable for the structural design of the double gripper. For example, the two grippers can be arranged on the same side of an arm of the tool gripping device. On the other hand, it is, however, also possible for the two grippers to be arranged opposite each other and coaxially with each other.

Since the workpieces usually have to be inserted into clamping means of the spindles or removed from these, it is necessary, in such cases, for the workpiece gripping device to be movable parallel to axes of rotation of the spindles in order to ensure exact removal and insertion of the workpieces.

In the embodiments of the multiple-spindle automatic lathe described so far, the workpiece gripping device could be arranged outside of the working area and grip into it. However, this has the great disadvantage that the working area which should remain closed for safety reasons and also on account of the large amounts of cooling and lubricating agent sprayed in the working area and the chips flying during the individual machining steps, must remain open. Therefore, in a preferred version of the inventive multiple-spindle automatic lathe, provision is made for the workpiece gripping device to be arranged in the working area and for both the selected spindle position and a workpiece transporting device arranged outside of the working area to lie within its gripping range so the workpiece gripping device can operate with its workpiece gripper, particularly during changeover, with the working area closed, and the working area need only be opened to grip a raw workpiece and/or deposit a finished workpiece.

In order to adapt the movement possibilities of the workpiece gripping device to the movements to be carried out by the workpiece gripper to as great an extent as possible, provision is made for the workpiece gripping device to comprise a swivel axis approximately parallel to the spindles so, for example, displacement of the workpiece gripping device in the longitudinal direction of the swivel axis automatically results in displacement parallel to the spindle axes.

In particular, for gripping shaft-type parts, it has proven expedient for the workpiece gripper to be a radial gripper with which, as already described in conjunction with the inventive method, transferral to a workpiece holding device can then preferably be dispensed with since rotation of the radial gripper results in reversal of the shaft-type part without further transferral and hence after rotation of the radial gripper through 180 degrees, the shaft-type part can be inserted with the side which has already been machined into the spindle standing in selected spindle positions.

Insofar as no shaft-type parts or similar parts to be gripped by a radial gripper are to be machined, i.e., in particular, when chucked parts are to be machined, it has proven expedient for the workpiece gripper to be an axial gripper with which the gripping parts can then be gripped from their front or end faces. So far, the workpiece holding device has not been specified in greater detail. It may, for example, in order to save space in the confined working area, be advantageous for the workpiece holding device to be arranged outside of the working area. This has the further advantage that no problems arise as far as contamination of the clamping means associated with the workpiece holding device is concerned.

In all cases in which the workpiece is to be changed over as quickly as possible, it will, however, be advantageous for the workpiece holding device to be arranged inside the working area since, in this case, the paths along which the workpiece have to be moved are substantially shorter.

A particularly efficient arrangement of the workpiece holding device is obtained by arranging it coaxially with the associated spindle position as it can then be moved very quickly towards the spindle or away from this spindle and, above all, centering motions during gripping or insertion of a workpiece into the spindle are dispensed with.

Especially in the latter case, it is advantageous for provision to be made for the workpiece holding device to be movable to and fro in the direction towards the associated spindle so direct transferral of the workpiece from the spindle to the workpiece holding device and vice versa is possible without additional use of the workpiece gripping device.

In quite a different embodiment of the inventive device, it may also be conceivable for the workpiece holding device to be arranged on the workpiece gripper, thereby obtaining an extremely space-saving structural solution in which, in addition, the workpiece holding device may likewise be used directly in the working area.

In all of the embodiments so far, it was not specified in which way the change in the clamping of the workpiece from the first side to the second side is to be carried out. As already described within the scope of the inventive method, multiple transferral is, for example, possible. However, since this is usually time-consuming in view of the multiple clamping or gripping operations, it likewise lies within the scope of the present invention for the workpiece holding device to be a workpiece reversing device so the change in the clamping of the workpiece from the first side to the second side can be carried out with as few transferral operations as possible.

In particular, in an embodiment in which the workpiece is to be transferred rotatingly to the workpiece holding device or is to be cut off, it is expedient for the workpiece holding device to comprise a chuck. In particular, when the workpiece is to be cut off before changeover without a burr remaining, it is additionally necessary for the workpiece holding device to be a synchronous spindle.

However, the inventive apparatus should also be suited for directly machining bar stock so it is not necessary for raw parts of a defined length to be made beforehand. For this reason, in an embodiment of the inventive apparatus intended for bar stock, it is desired for the feeding means for raw workpieces to be a bar feeding device associated with the spindle position intended therefor. In this case—in contrast with the machining of chucked parts—the feeding of the raw parts directly to the respective first spindle is carried out when it is standing in the spindle position provided for the feeding, conveying away and changeover. Here, it has proven particularly expedient for the workpiece gripper to comprise a stop surface serving as delimitation for advance of the bar stock and to preferably include a sensor to indicate that the bar stock is striking the stop surface.

As already explained in conjunction with the inventive multiple-spindle automatic lathe, a great advantage of the invention consists in the first and second spindles comprising different clamping means for clamping the workpieces with the first or second side, respectively, and, consequently, in the clamping means being adaptable in an optimal way to the respective requirements.

On the other hand, in certain special embodiments of the inventive multiple-spindle automatic lathe, it is, however, desirable for the first and second spindles to comprise clamping means which permit clamping of the workpieces on both sides since such multiple-spindle automatic lathes can be used in a more universal way provided that no problems are created by clamping with the same clamping means.

The inventive multiple-spindle automatic lathes have not been specified in greater detail in the foregoing with respect to the possibilities of machining the workpieces in the individual spindle positions. It is advantageous for at least one tool carrier to be associated with each spindle position provided for machining the workpieces. Hence a tool carrier is to be associated with at least each spindle position, with the exception of the spindle position for feeding, conveying away and changing over the workpieces. However, insofar as the spindle position for feeding, conveying away and changing over the workpieces is also to be used simultaneously for machining, then in accordance with the invention, at least one tool carrier is also to be associated with it.

In accordance with the invention, machining of the workpieces in the individual spindle positions can be carried out even more efficiently by several tool carriers being associated with one or several spindle positions so several cutting operations can take place simultaneously in these spindle positions.

If, in accordance with the invention, in each spindle position, both machining of the front side and machining of the rear side are to take place, it is necessary for the tool carrier to be displaceable in at least one direction towards the spindles so that depending on whether the front or rear side is to be machined in this spindle position, the tool carrier can be displaced accordingly.

However, the inventive multiple-spindle automatic lathe is substantially more flexible if several tool carriers are movable in at least one plane and optimal flexibility is achieved when several tool carriers are movable in all three directions in space.

Since it is within the scope of the present invention for the workpieces to be machinable on both the front and rear sides in each spindle position, and the number of tool carriers associated with the individual spindle positions cannot be optionally selected, for space reasons alone, the tool carriers are preferably equipped with universal tools.

Another possibility of carrying out different machining operations with one and the same tool carrier consists in equipping the tool carriers, in accordance with the invention, with combination tools, i.e., such tools as, for example, carry different types of tools on two opposite sides which can be used independently of one another by appropriate displacement of the tool carrier.

Figure 2:
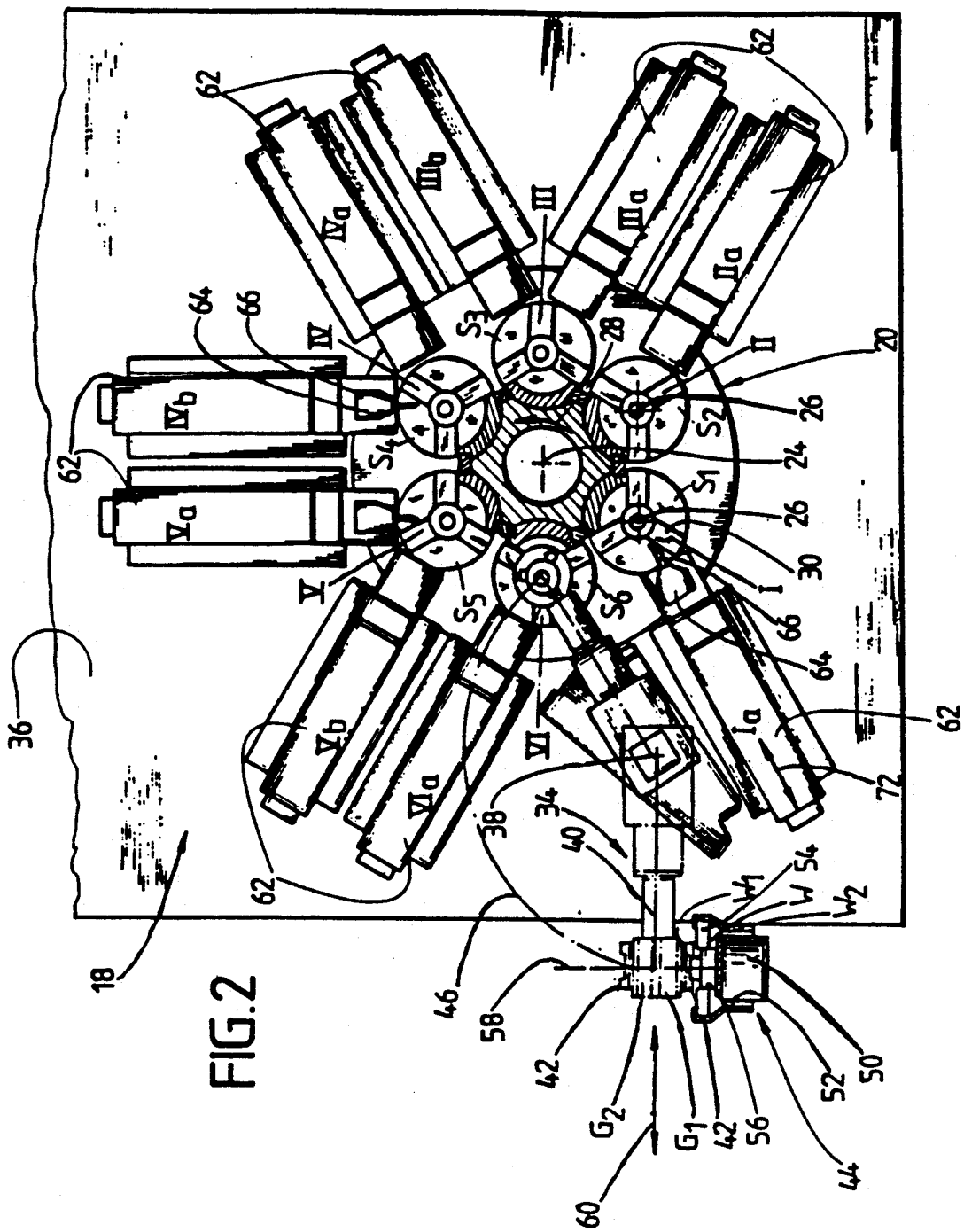
Figure 3:
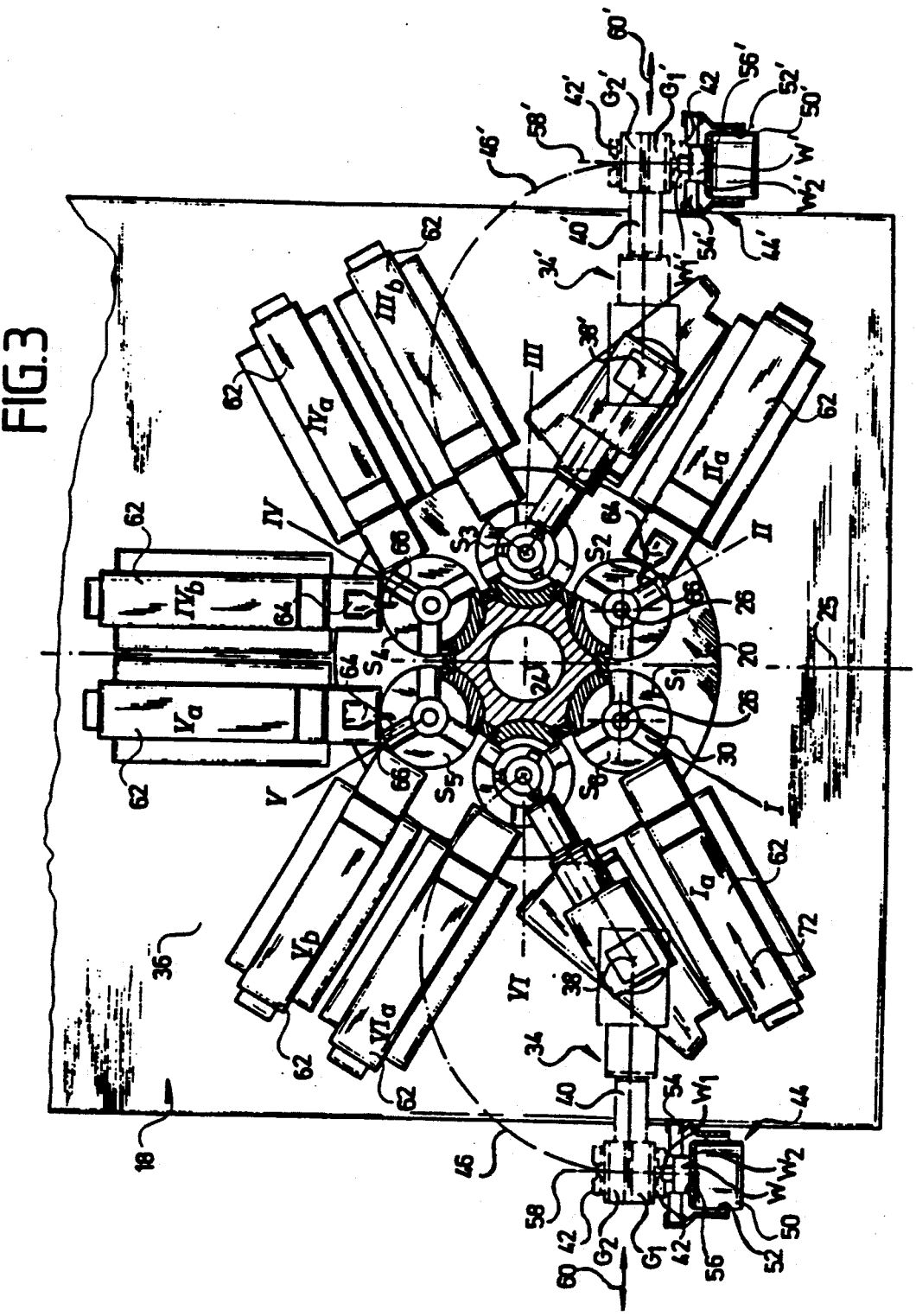
Figure 6A:
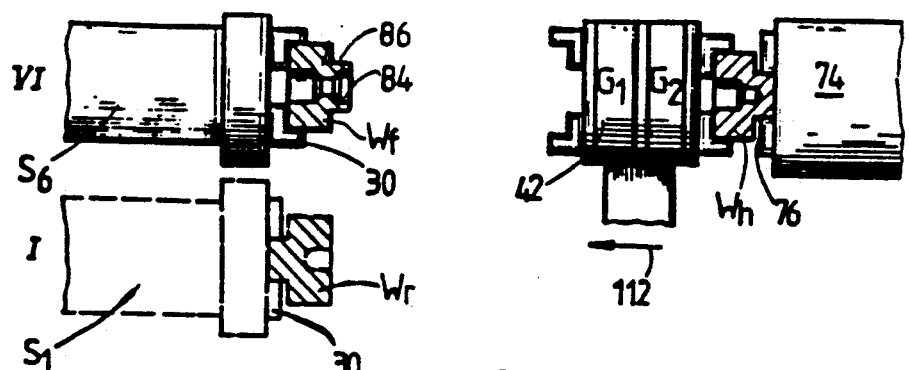
Figure 6B:
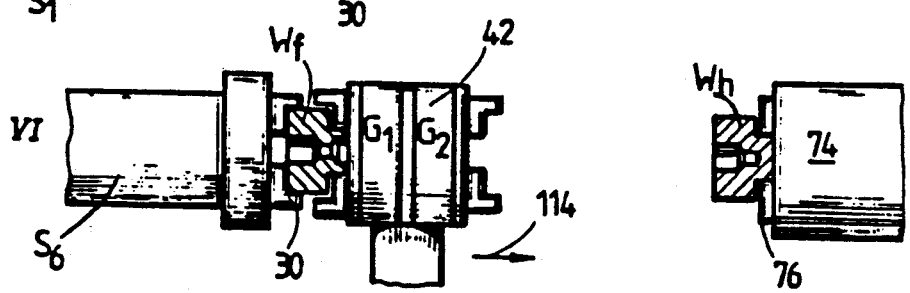
Figure 6C:
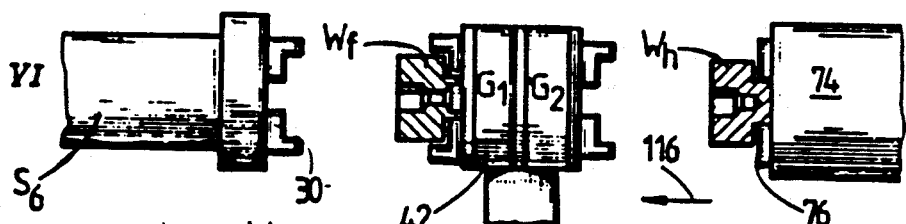
Figure 6D:
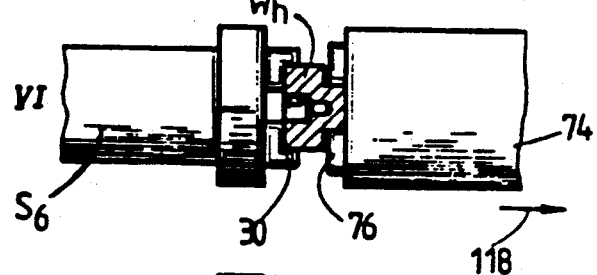
Figure 6E:
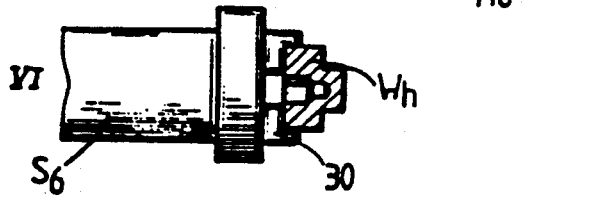
Figure 7:
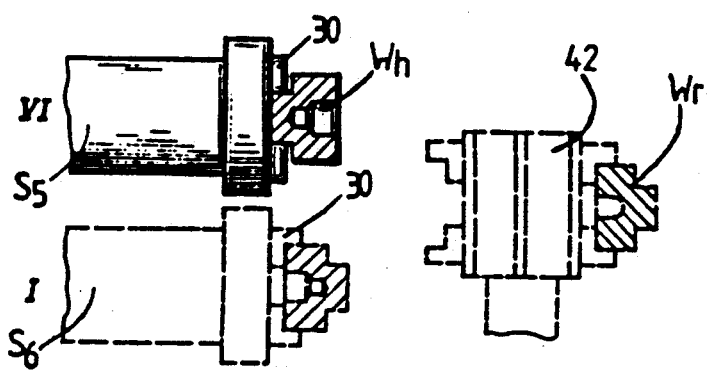

Further features and advantages of the present invention are the subject of the following description and the drawings of some embodiments. The drawings show:

FIG. 1: a schematic perspective view of a first embodiment of an inventive multiple-spindle automatic lathe;

FIG. 2: a sectional view along line 2—2 in FIG. 1 without tool holding devices and workpiece holding device;

FIG. 3: a sectional view corresponding to FIG. 2 of a second embodiment;

FIG. 4($a$–$b$): a schematic plan view of a spindle drum for machining chucked parts in accordance with the first embodiment with a workpiece holding device illustrated out-of-line and all workpieces indicated by their clamping diameter only;

FIGS. 5($a$–$f$), 6($a$–$e$) and 7: a schematic illustration of handling operations in accordance with the inventive method for machining chucked parts;

FIG. 8($a$–$b$): a schematic plan view corresponding to FIG. 4 of a spindle drum in accordance with the second embodiment;

FIG. 9($a$–$b$): a schematic plan view of a spindle drum for machining bar stock similar to FIG. 4;

FIGS. 10($a$–$c$), 11($a$–$f$) and 12: a schematic illustration corresponding to FIGS. 5, 6 and 7 in accordance with the inventive method for machining bar stock;

FIG. 13($a$–$f$): a comparison of special cutting operations which can be carried out in each spindle position on the basis of the inventive method for machining bar stock, wherein all of the simultaneously performed cutting operations are schematically illustrated in each vertical column and the left column differs from the right column by one indexing step;

FIG. 14(a-b): a schematic plan view corresponding to FIG. 8 of a spindle drum in accordance with the second embodiment for machining bar stock;

FIG. 15: a partly broken-open side view of a variant of a double gripper;

FIG. 16: a sectional view similar to FIG. 2 of a third embodiment.

FIG. 1 shows in detail a first embodiment of a multiple-spindle automatic lathe designated in its entirety 10. A frame 12 thereof with two housing sections 14 and 16 placed thereon is visible. Housing sections 14 and 16 delimit a working area 18 of the multiple-spindle automatic lathe 10 located between these.

A spindle drum 20, likewise held on frame 12, is substantially covered by housing section 14. Therefore, only an end face 22 of spindle drum 20 which faces working area 18 is visible. Spindle drum 20 is rotatable about an axis of rotation 24 extending substantially horizontally. It carries a total of six spindles $S_1$ to $S_6$, arranged in spindle drum 20 in such a way that all spindle axes 26 of spindles $S_1$ to $S_6$ lie parallel to the axis of rotation 24, are spaced at the same distance from it and are also arranged at the same angular spacing from one another relative to the axis of rotation 24.

As apparent, in particular, also from FIG. 2, spindles $S_1$ to $S_6$ can be brought into a total of six spindle positions I to VI by the spindle drum 20 which is indexable in a stepwise manner through an angle corresponding to the angular spacing between two successive spindles. The spindle positions are defined in a fixed manner on the housing and do not move with rotation of spindle drum 20. In the indexed position of spindle drum 20 illustrated in FIG. 2, spindle $S_1$ is associated with spindle position I, spindle $S_2$ with position II, etc. Spindle drum 20 can be indexed one step in accordance with an indexing direction which extends counterclockwise and is indicated by an arrow 28. Therefore, with the next indexing step, spindle $S_1$ will be associated with spindle position II, spindle $S_2$ with spindle position III, etc.

Each of the spindles $S_1$ to $S_6$ has one clamping means which in accordance with the illustration in FIG. 2, is a chuck 30.

This chuck 30 must be capable of clamping a workpiece W illustrated, for example, in FIG. 5, on a first side $W_1$ or a second side $W_2$. Workpieces W are arranged in spindles $S_1$ to $S_6$ in such a way that successive spindles clamp workpieces W alternately on their first side $W_1$ or their second side $W_2$. For example, in accordance with the illustration in FIG. 2, spindle $S_1$ is to clamp workpiece W on the first side $W_1$, spindle $S_2$ workpiece W on the second side $W_2$, etc. Therefore, in spindles $S_1$, $S_3$ and $S_5$, workpieces W are clamped on their first side $W_1$ and in spindles $S_2$, $S_4$, $S_6$, workpieces W are clamped on their second side $W_2$.

Associated with spindle position VI is a first workpiece gripping device 34 comprising an arm 40 which is mounted at the side of spindle drum 20 on a front side 36 of housing section 14 facing working area 18 for rotation about a swivel axis 38 generally parallel to spindle axis 26. Arm 40 extends in a plane extending substantially perpendicularly to the spindle axis and has at its outer end a double gripper 42 comprised of two opposed workpiece grippers $G_1$ and $G_2$. The length of arm 40 of workpiece gripping device 34 is so selected that when gripping device 34 has been swivelled into spindle position VI (FIG. 2), workpiece grippers $G_1$ and $G_2$ stand coaxially with the spindle standing in this spindle position VI, in FIG. 2 spindle $S_6$, and hence are capable of gripping workpieces W clamped in spindle $S_6$. To remove workpieces W in this position from spindle $S_6$ or to also insert them into it, arm 40 of workpiece gripping device 34 is mounted for displacement in the direction of its swivel axis 38.

By swivelling of arm 40 about swivel axis 38, workpiece gripping device 34 can be swivelled into a position associated with a workpiece transporting device 44 (illustrated by dot-and-dash lines in FIG. 2), in which case double gripper 42 moves along a swivel circle 46. The workpiece transporting device 44 lies outside of working area 18 and extends along a front side 48 of housing section 14.

The workpiece transporting device 44 comprises a carrier 50 and a conveyor belt 54 which is held by guides 52 and has recesses 56 adapted to workpiece W. Workpiece W is held in a generally horizontal position in recesses 56. Hence an axis 58 of the workpiece W held in recess 56 stands generally in the vertical direction.

In order that double gripper 42 has access to both workpieces W in transporting device 44 whose axes 58 stand generally in the vertical direction, and to workpieces W in spindle position VI whose axes extend parallel to spindle axis 26 and hence essentially horizontally, double gripper 42 must be rotatable about a longitudinal axis 60 of arm 40 of workpiece gripping device 34 extending transversely to spindle axis 26.

Workpiece transporting device 44 is controlled in such a way that, in each case, a recess 56 stands such that the axis 58 of a workpiece W accommodated or to be accommodated therein stands coaxially with one of grippers $G_1$ or $G_2$ of double gripper 42 in its position associated with workpiece transporting device 44, thereby to enable workpiece W to be inserted into or removed from recess 56.

To machine workpieces W held in spindles $S_1$ to $S_6$ in spindle positions I to VI, tool carriages 62 carrying tool holders 64 with tools 66 are associated with each of these spindle positions I to VI. Depending on the spindle position I to VI with which they are associated, the tool carriages are designated, in addition, by the number I to VI corresponding to the respective spindle position and by an a or b. Hence, for example, tool carriage 62, designated $I_a$, is associated with spindle position I, and two tool carriages 62, additionally designated $III_a$ and $III_b$ are associated with spindle position III. These tool carriages are usually movable in at least one plane fixed by two directions standing perpendicularly on one another. It is also worthy of mention that there is also associated with spindle position VI to which workpiece gripping device 34 has access, a tool carriage 62, additionally designated by $VI_a$. Hence machining of the workpieces W clamped in spindles $S_1$ to $S_6$ can be carried out in each of the spindle positions I to VI by the tools 66 carried by the respective tool carriages 62.

In addition, as is apparent, in particular, from FIG. 1, further tool holding devices 68 are associated with each of the spindle positions I to V. These are each displaceable parallel to the respective spindle axis 26 in the direction towards the tools clamped in the respective spindles $S_1$ to $S_5$. These tool holding devices 68 likewise carry tools 70. The tool holding devices 68 are preferably used with their tools 70 for making bores or cutting annular grooves and the like, whereas tools 66 mainly serve to machine side surfaces of the workpieces W. In the simplest case, the tool holding device 68 lies coaxially with the respective spindle axis 26 and carries a drill as tool 70.

As will be explained in detail below, it is particularly advantageous for tools 66 and also tools 70 to be at least partly combination tools with two cutting edges which can be used independently of one another. In this way, for example, tool 70 may have a cutting insert for drilling bores and opposite thereto a cutting insert for thread cutting. Of course, in this case, the tool holding device 68 must be movable not only parallel to the spindle axis associated with it, but also perpendicularly thereto in order that only one of the cutting inserts is used in each case. The same also applies to tool carriages 62 which in the case of combination tools must be displaceable not only exclusively in the radial direction 72 relative to the respective spindle axis 26, but must, in addition, be movable in at least one direction perpendicularly to this radial direction 72. This direction extends, for example, parallel to the respective spindle axis 26. It is, however, also possible for this additional direction to lie parallel to the front side 36 of housing section 14.

In the first embodiment of the inventive apparatus, it is not a tool holding device 68 that is associated with spindle position VI but instead of that a workpiece holding device in the form of a push-in device 74 which is arranged coaxially with the spindle axis 26 of the spindle standing in this spindle position VI and is also displaceable in this direction. At its end associated with the respective spindle, the push-in device 74 carries a clamping means 76 which may, for example, be a collet or a chuck. The push-in device 74 is movable in the direction of the spindle standing in spindle position VI to such an extent that it can grip the workpiece W clamped in this spindle on the still free side $W_1$ or $W_2$.

In a second embodiment of the inventive multiple-spindle automatic lathe 10, a second workpiece gripping device 34', identical with workpiece gripping device 34, is provided in mirror-image relation to a vertical mirror plane 25 extending through the axis of rotation 24 of spindle drum 20. Hence all parts of workpiece gripping device 34' have the same reference numerals as those of workpiece gripping device 34 and are additionally designated by an '. For a description of these, reference is made to the description of workpiece gripping device 34.

In a similar manner, a workpiece transporting device 44' having the same parts as workpiece transporting device 44 is associated with workpiece gripping device 34'. Hence all reference numerals for identical parts are the same but are designated by an additional ' in the case of workpiece transporting device 44'.

In addition, a workpiece holding device which can perform the same operations as push-in device 74 is associated as push-in device 74' with spindle position III.

The function of the first embodiment of the inventive multiple-spindle automatic lathe will be explained by the example of workpieces W representing chucked parts with reference to FIGS. 4 to 7, assuming that the chucks 30 of spindles $S_1$ to $S_6$ are suited for clamping workpieces W representing chucked parts both on their first side $W_1$ and on their second side $W_2$. More particularly, spindles $S_1$, $S_3$ and $S_5$ are provided for clamping workpieces W on their first sides $W_1$ and spindles $S_2$, $S_4$ and $S_6$ for clamping workpieces W on their second sides $W_2$.

Figure 4A:
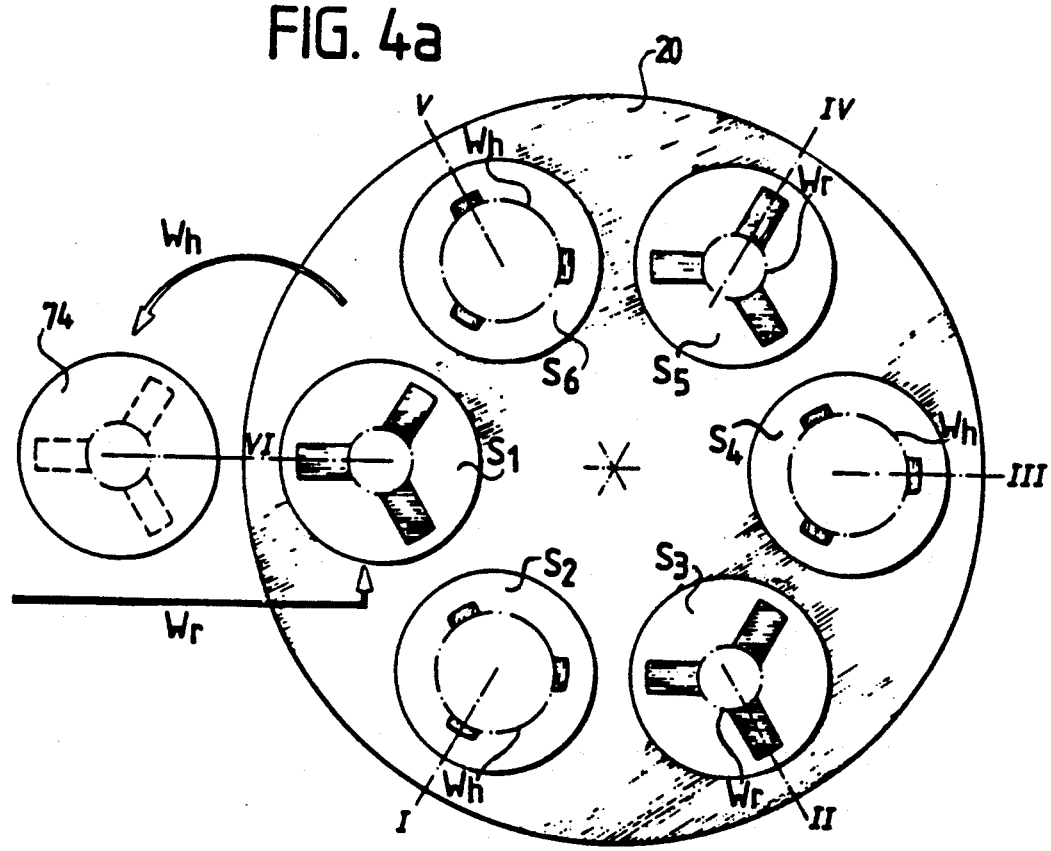
Figure 4B:
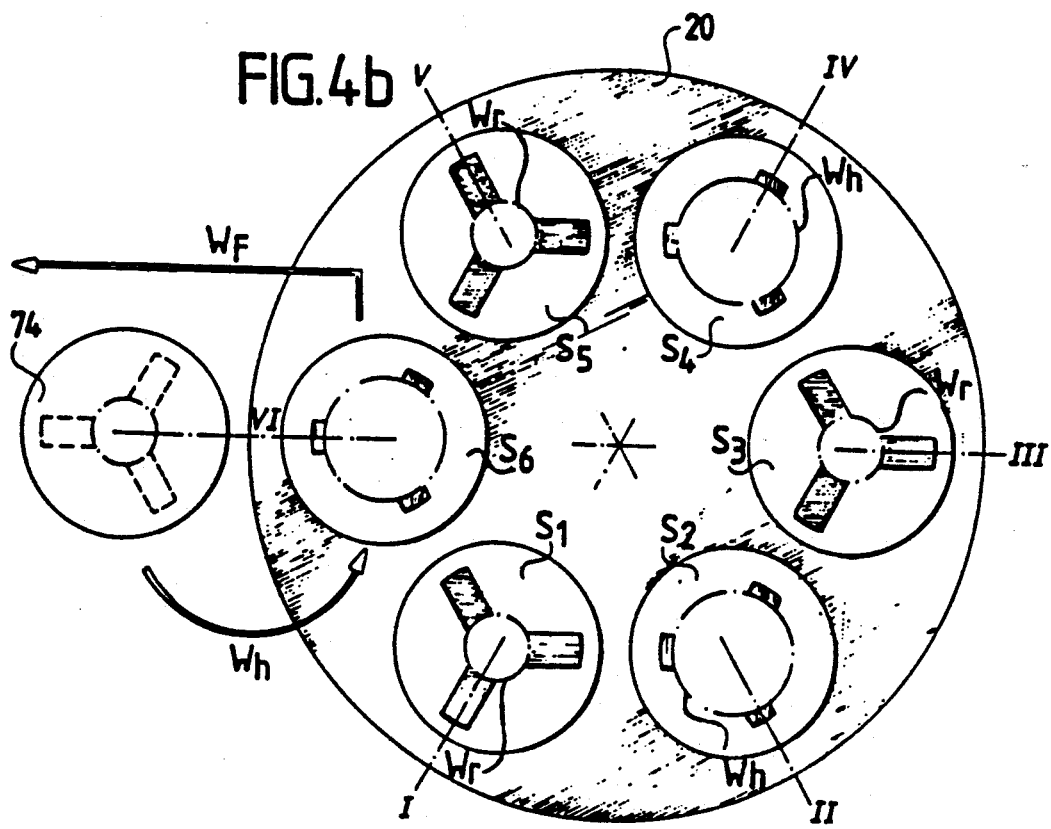

A schematic illustration of the performance of the inventive method with the described first embodiment of the multiple-spindle automatic lathe is given in FIGS. 4a and 4b. In these Figures, workpiece W itself is not illustrated, but merely indicated by its clamping diameter in dot-and-dash lines. FIGS. 4a and 4b differ in that spindle drum 20 in FIG. 4b is indexed one step further than in FIG. 4a. Hence in FIG. 4b, spindle $S_6$ is standing in spindle position VI, whereas in FIG. 4a, spindle $S_1$ is standing in spindle position VI.

When, as shown in FIG. 4a, spindle $S_1$ provided for clamping chucked parts W on their first sides $W_1$ arrives in spindle position VI, the following method steps are carried out:

First, the chucked part W clamped on its first side $W_1$ in spindle $S_1$, which has already gone through a machining cycle through spindle positions I to VI and hence is a half-finished part $W_h$, is removed by gripper $G_2$, not illustrated in the drawings, and transferred to push-in device 74, drawn out-of-line towards the left in FIG. 4, for reasons of clarity, which likewise grips this half-finished part $W_h$ on its first side $W_1$. A raw workpiece or part $W_r$ delivered by workpiece transporting device 44 is then inserted into the now "empty" spindle $S_1$ by gripper $G_1$ and clamped in this spindle $_1$.

Spindle drum 20 is next indexed one step, as shown in FIG. 4b.

The raw part $W_r$ clamped in spindle $S_1$ is standing in spindle position I and is machined there in accordance with a given program.

Spindle $S_6$ carrying a workpiece W clamped on the second side $W_2$ has now arrived in spindle position VI. This workpiece W clamped on side $W_2$ has already passed through spindle positions I to VI twice, a first time for machining the second side $W_2$ up to the half-finished part $W_h$ and a second time for machining the first side $W_1$ up to a finished part $W_f$. This finished part $W_f$ is removed from spindle $S_1$ by gripper $G_1$ and transferred to workpiece transporting device 44. The half-finished part $W_h$ clamped on its first side $W_1$ is then transferred to the now "empty" spindle $S_6$ by push-in device 74 and it can, therefore, be clamped on its second side $W_2$ by spindle $S_6$. Spindle drum 20 is then indexed one step further and so spindle $S_5$ now stands in spindle position VI. The half-finished part $W_h$ clamped in spindle $S_6$ now passes through all of the spindle positions I to V and arrives in spindle position VI again as finished part $W_f$ which can then be removed.

When spindle $S_5$ is standing in spindle position VI, the situation is the same as in FIG. 4a, i.e., the same method steps are carried out again, as already described in FIG. 4a, with the only difference that it is no longer $S_1$ that is standing in spindle position VI but spindle $S_5$.

The inventive method, illustrated in FIGS. 4a and 4b, can be summarized in the following way:

First, a raw part $W_r$ is clamped on its first side $W_{r1}$ in one of spindles $S_1$, $S_3$ and $S_5$ in spindle position VI. In this clamped state, it passes through spindle positions I to V and arrives in spindle position VI after machining of its second side $W_{r2}$ as half-finished part $W_h$. There, the half-finished part $W_h$ is removed, changed over into push-in device 74, awaits the next indexing step there and can then be inserted by push-in device 74 into one of spindles $S_2$, $S_4$ and $S_6$ in such a way that the half-finished part $W_h$ is clamped on its second side $W_{h2}$. Hence machining of the first side $W_{h1}$ is now possible as it passes through spindle positions I to V, and so this half-finished part $W_h$ then arrives in spindle position VI as finished part $W_f$ and can be removed.

The steps to be carried out in spindle position VI for feeding a raw part $W_r$, changing over a half-finished part $W_h$ and removing a finished part $W_f$ will now be explained in detail with reference to FIGS. 5 to 7.

First, a workpiece $W_r$ is delivered as raw part by workpiece transporting device 44 and oriented in recess 56 in such a way that it can be gripped on its second side $W_{r2}$ by workpiece gripper $G_1$ when workpiece gripping device 34 is in the position (illustrated by dot-and-dash lines in FIG. 2) associated with workpiece transporting device 44. Workpiece gripping device 34 is now swivelled about swivel axis 38 into the position associated with spindle position VI, and double gripper 42 is simultaneously rotated about longitudinal axis 60 of arm 40 to such an extent that double gripper 42 stands coaxially with spindle $S_1$ standing in spindle position VI with gripper $G_2$ facing spindle $S_1$. Hence gripper $G_1$ with the workpiece $W_r$ gripped on side $W_{r2}$ faces away from spindle $S_1$. In this position, double gripper 42 stands between spindle $S_1$ in spindle position VI and the push-in device 74 (FIG. 5a) associated with this spindle position.

It was already mentioned that spindles $S_1$, $S_3$ and $S_5$ are provided for clamping workpieces W on their first side $W_1$. For this reason, spindle $S_1$, as shown in FIG. 5a, is already carrying a half-finished workpiece $W_h$ which is clamped on the first side $W_1$ and has gone through one machining cycle. This means that the workpiece $W_h$ clamped spindle $S_1$ was inserted in spindle position VI into spindle $S_1$ six indexing steps of spindle drum 20 previously and was machined to a half-finished part by tools 66 and 70 as it passed through spindle positions I to V. Hence, as shown in FIG. 5a, it has a stepped bore 80 and has also already undergone preliminary machining on a circumferential surface 82.

As indicated by arrow 100, workpiece gripping device 34 is now moved in the direction of swivel axis 38 towards spindle $S_1$ and so gripper $G_2$ can grip workpiece $W_h$ clamped in spindle $S_1$ on the second side $W_{h2}$ (FIG. 5b). In order to be able to grip workpiece $W_h$ clamped in spindle $S_1$ with gripper $G_2$, the chuck 30 of spindle $S_1$ is opened. Workpiece gripping device 34 can then be moved away again in the direction of swivel axis 38 from spindle $S_1$ in the direction of arrow 102 and so double gripper 42 again stands between spindle $S_1$ and push-in device 74 (FIG. 5c). Subsequent rotation of double gripper 42 through 180 degrees in accordance with an arrow 104 results in gripper $G_1$ now facing spindle $S_1$ with its raw part $W_r$ (FIG. 5d).

Insertion of raw part $W_r$ into spindle $S_1$ is carried out by renewed motion of workpiece gripping device 34 parallel to swivel axis 38 in the direction of arrow 106 towards spindle $S_1$. Hence workpiece $W_r$ is inserted with its first side $W_{r1}$ into chuck 30 of spindle $S_1$ and can then be clamped (FIG. 5e). After gripper $G_1$ is opened, workpiece gripping device 34 is again moved in the direction of arrow 108 away from spindle $S_1$ into the position located between it and push-in device 74. Raw part $W_r$ is thus clamped in spindle $S_1$ and can subsequently go through a machining cycle through all of the spindle stations I to V (FIG. 5f).

For this reason, spindle drum 20 is indexed one step and so spindle $S_6$ now stands in spindle position VI, as shown in FIG. 6a. The spindle $S_1$ shown in dashed lines in FIG. 6a with raw part $W_r$ is now standing in spindle position I and is machined there by, for example, tool 66.

Before or during indexing of spindle drum 20, workpiece gripping device 34 is moved parallel to swivel axis 28 in the direction of push-in device 74 and so the half-finished part $W_h$ held in gripper $G_2$ can be gripped by clamping means 76 of push-in device 74.

As explained at the beginning, spindles $S_2$, $S_4$ and $S_6$ are provided for clamping workpieces W on their second sides $W_2$. The spindle $S_6$ shown in FIG. 6a carries a workpiece $W_f$ representing a finished part when it is standing in spindle position VI. This was inserted as half-finished part $W_h$ into spindle $S_6$ in spindle position VI—as will be explained in detail below—and has gone through a machining cycle covering spindle positions I to V. Workpiece $W_f$ was, for example, provided with a further stepped bore 84 and, in addition, machined on a circumferential surface 86 associated with the first side $W_{f1}$. Hence workpiece $W_f$ is now available as finished part in spindle position VI.

After gripper $G_2$ is opened, workpiece gripping device 34 is moved parallel to swivel axis 38 in the direction of arrow 112 towards spindle $S_6$ and so gripper $G_1$ can grip finished part $W_f$ on the first side $W_{f1}$ (FIG. 6b).

The chuck 30 of spindle $S_6$ is opened to enable workpiece gripping device 34 to be moved in the direction of arrow 114 into that position again in which double gripper 42 is located between spindle $S_6$ and push-in device 74 (FIG. 6c). In order to deposit finished part $W_f$, the entire workpiece gripping device with the double gripper is swivelled along swivel circle 46 into the position associated with workpiece transporting device 44 and simultaneously rotated about longitudinal axis 60 through 90 degrees, thereby to enable finished part $W_f$ to be deposited in recess 56 of conveyor belt 54 from which workpiece $W_r$ was previously removed as raw part.

Since double gripper 42 is no longer standing between push-in device 74 and spindle $S_6$, push-in device 74 can be moved in the direction of arrow 116 out of its position shown in FIG. 6c in the direction of spindle $S_6$ and the half-finished part $W_h$ transferred to spindle $S_6$ (FIG. 6d). After transferral, push-in device 74 is driven back again in the direction of arrow 118 away from spindle $S_6$ into its original position (FIG. 6e). Half-finished part $W_h$ is now clamped on a second side $W_{h2}$ in spindle $S_6$ and can subsequently be made to undergo a machining cycle in spindle positions I to V by indexing the spindle drum.

After spindle drum 20 is indexed again one step, spindle $S_5$ carrying a half-finished part $W_h$ clamped on its first side $W_{h1}$ (FIG. 7), therefore, appears in spindle position VI. Hence the initial situation is the same as that in FIG. 5a and the same steps are to be carried out as in FIGS. 5 and 6. Of course, workpiece gripping device 34 must be able to remove a raw part $W_r$ from workpiece transporting device 44 beforehand. To this end, after insertion of the finished workpiece $W_f$, the workpiece transporting device is to be moved further so that a raw part $W_r$ is again available for gripper $G_1$ in a following recess 56. After all transfers, as described above for spindle $S_1$ in spindle position VI, have been carried out with spindle $S_5$ standing in spindle position VI, spindle drum 20 is indexed again one step. Hence spindle $S_4$ now appears in spindle position VI and the situation is the same as in FIG. 6a and, consequently, also the transfers illustrated in FIGS. 6a to 6e are to be carried out.

Figure 8A:
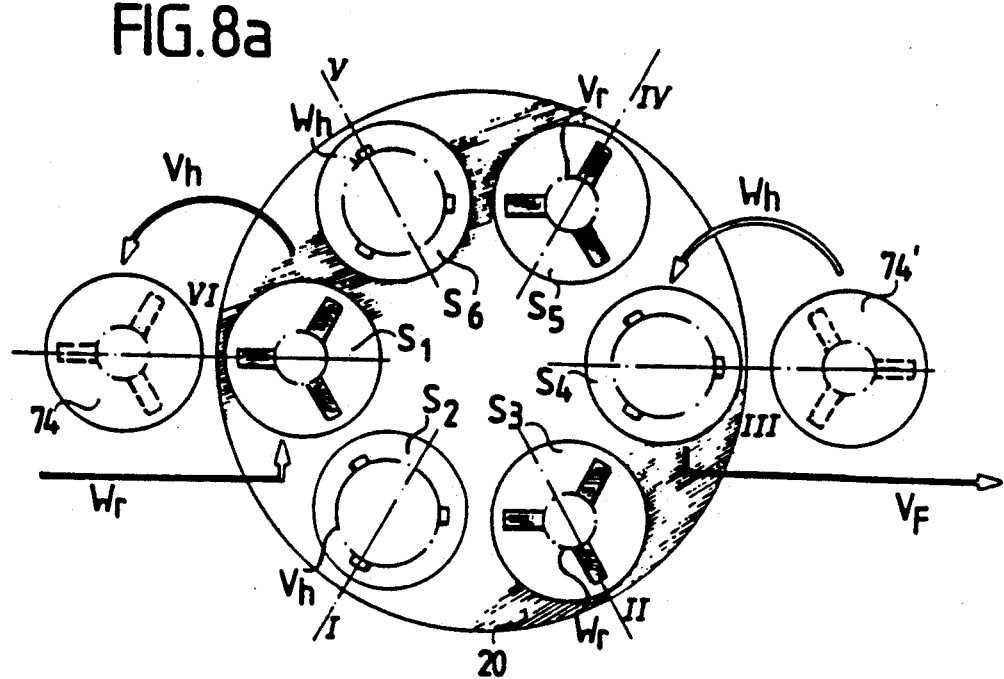
Figure 8B:
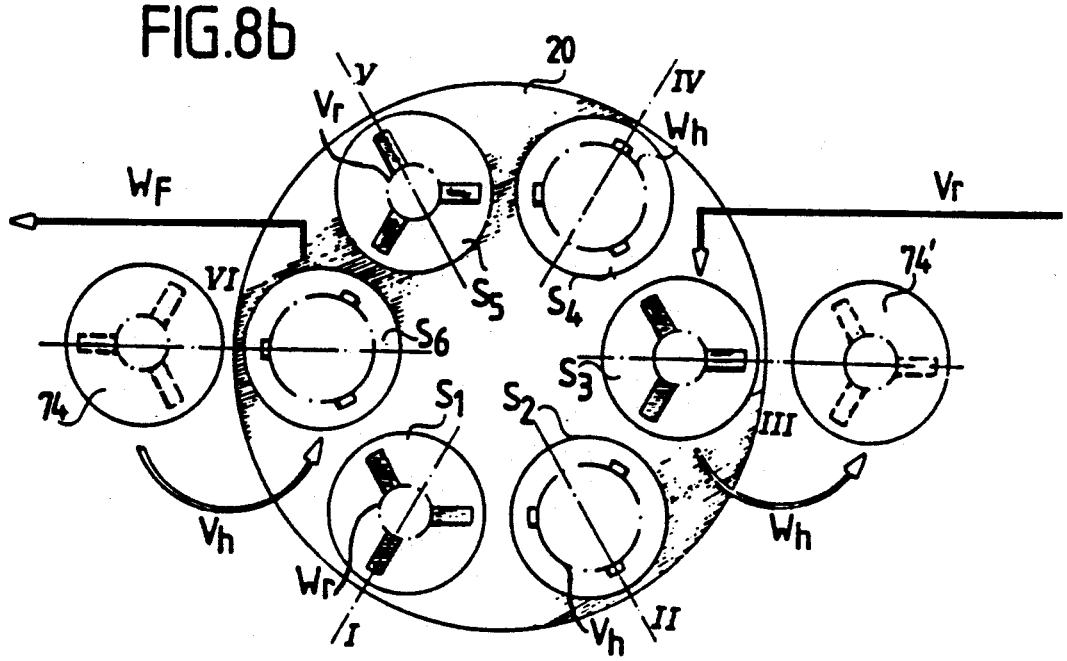

In FIGS. 8a and 8b, performance of the inventive method is schematically illustrated with a multiple-spindle automatic lathe according to the second embodiment illustrated in FIG. 3.

FIGS. 8a and 8b likewise differ in that spindle drum 20 is indexed one step further in FIG. 8b than in FIG. 8a and, consequently, spindle $S_6$ is standing in spindle position VI in FIG. 8b, whereas spindle $S_1$ is standing in spindle position VI in FIG. 8a.

In contrast with the first embodiment, illustrated in FIGS. 4a and 4b, in the second embodiment both workpieces W, fed as raw parts $W_r$ and conveyed away as finished parts $W_f$, in spindle position VI, and workpieces V, fed as raw parts $V_r$ and conveyed away as finished parts $V_f$, in spindle position III, are simultaneously machined.

When, as shown in FIG. 8a, spindle $S_1$ has arrived in spindle position VI, a workpiece V clamped on its first side $V_1$ and, therefore, already machined to a half-finished part $V_h$ on the second side is removed there and fed to the push-in device 74, drawn out-of-line towards the left, for reasons of clarity, by which it is likewise held on its first side $W_1$. This half-finished part $V_h$ arriving in spindle position VI was originally inserted in spindle position III (see FIG. 8b) as raw part $V_r$, clamped on its first side and, therefore, machined on its second side in spindle positions IV and V.

A raw part $W_r$ of workpiece W is now inserted from the outside into this now "empty" spindle S and likewise clamped on its first side $W_1$. This raw part $W_r$ is now machined on its second side as it passes through spindle positions I and II and arrives in spindle position III as half-finished part $W_h$ (see FIG. 8b). There, this half-finished part $W_h$ is removed from the spindle and inserted into push-in device 74', and, in turn, a raw part V is simultaneously fed to the now empty spindle.

In FIG. 8b, spindle drum 20 is indexed one step, i.e., spindle $S_6$ is now standing in spindle position VI. A finished part $W_f$, clamped on its second side $W_2$, now arrives in it and is conveyed away there. This finished part $W_f$ was previously removed as half-finished part (see FIG. 8a) from push-in device 74' in spindle position III and inserted into the spindle in which it was clamped on its second side $W_2$. Hence the half-finished part $W_h$ was able to be machined on its second side $W_{h2}$ as it passed through spindle positions IV and V until it arrived as finished part $W_f$ in spindle position VI.

The half-finished part $V_h$ fed to push-in device 74 during the previous indexing step is now inserted into the empty spindle $S_6$ and clamped on its second side $V_{h2}$. It can now pass through spindle positions I and II in which it is machined on its first side $W_{h1}$ until it arrives as finished part $V_f$ in spindle position III (see FIG. 8a). In it, the finished part $V_f$ is removed and conveyed away, and, simultaneously, as explained above, a half-finished part $W_h$ is inserted into the now "empty" spindle and clamped on its second side $W_{h2}$.

Accordingly, in the inventive method using the second embodiment of the multiple-spindle automatic lathe, a raw part $W_r$ is clamped on its first side by one of spindles $S_1$, $S_3$ and $S_5$ in spindle position VI, passes through spindle positions I and II with this spindle, arrives in spindle position III as half-finished part $W_h$, is removed there and inserted into push-in device 74' as half-finished part $W_h$. In this push-in device 74', the half-finished part $W_h$ awaits an indexing step of spindle drum 20, and so one of spindles $S_2$, $S_4$, $S_6$ then stands in spindle position III. If this is the case, the half-finished part $W_h$ is then removed from push-in device 74' and inserted into one of spindles $S_2$, $S_4$, $S_6$ which can clamp the half-finished part $W_h$ on its second side $W_{h2}$. In this clamped state, the half-finished part $W_h$ passes through spindle positions IV and V in which this half-finished part $W_h$ is machined on the first side. When the half-finished part $W_h$ has then arrived in spindle position VI as finished part $W_f$, it can be removed there and conveyed away. The procedure with workpieces V is carried out in a similar manner, but based on spindle position III. A raw part $V_r$ is inserted in spindle position III into one of spindles $S_1$, $S_3$ and $S_5$, and clamped there on its first side $V_{r1}$. In this clamped state, it passes through spindle positions IV and V, is machined there on its second side $V_{r2}$ and arrives as half-finished part $V_h$ in spindle position VI (see FIG. 8a). There, the half-finished part $V_h$ is removed and inserted into push-in device 74. After a further indexing step, the half-finished part $V_h$ is removed again from push-in device 74 and inserted into one of spindles $S_2$, $S_4$, $S_6$ and clamped in it on its second side $V_{h2}$. The machining of the first side $V_{h1}$ can then be carried out in spindle positions I and II until the half-finished part $V_h$ on which machining has now been completed arrives again in spindle position III as finished part $V_f$ and can be conveyed away there.

The individual changeover steps carried out in spindle positions VI and III correspond to those of FIGS. 5 to 7, with the only difference that the half-finished part $W_h$, $V_h$ changed over in these spindle positions VI and III is not fed in these spindle positions but in the respective other spindle position. Reference is, therefore, also made to the corresponding parts of the description of FIGS. 5 to 7.

As is apparent from the above description, workpieces W and V may be basically different workpieces, but they must have such similarity with one another that spindles $S_1$, $S_3$ and $S_5$ and also spindles $S_2$, $S_4$ and $S_6$ enable, without conversion, workpieces W and V to be clamped on their first and second sides, respectively. On the other hand, it is likewise within the scope of the inventive solution to work with identical workpieces W and V, thereby enabling the efficiency of the inventive multiple-spindle automatic lathe to be doubled because a total of four machining stations is adequate, in each case, for these workpieces W and V.

Provision may also be made for machining bar stock with the first embodiment of the inventive multiple-spindle automatic lathe. Accordingly, in such a case, workpieces W are not fed as unmachined chucked parts, but rather in the form of bar stock. For this reason, spindles $S_1$, $S_3$ and $S_5$ are not provided with a chuck 30, in each case, but with a collet 32, in each case, and bar stock 120 is fed through coaxially with the collets 32 of spindles $S_1$, $S_3$ and $S_5$. Also, the workpiece holding device is not a push-in device, but rather a synchronous spindle 74 which can be driven at the same speed as the spindle standing in spindle position VI and, in addition, is movable exactly like the push-in device in the direction of the spindle standing in spindle position VI.

FIGS. 9a and 9b illustrate schematically performance of the inventive method for machining bar stock on a multiple-spindle automatic lathe according to the first embodiment shown in FIGS. 1 and 2. Herein, workpiece W' itself is not illustrated, but, in each case, its clamping diameter is indicated by dot-and-dash lines only.

As is to be seen in FIG. 9a, a half-finished workpiece $W_{h'}$ in spindle $S_1$ arrives in spindle position VI. However, this half-finished part is still connected to the bar stock pushed coaxially through spindle $S_1$ or its collet 32, respectively. For this reason, simple changeover of the half-finished part $W_{h'}$ is not possible in spindle position VI, but rather the synchronous spindle arranged coaxially with the collet is brought up to the half-finished part, grips it and the half finished part $W_{h'}$ is cut off from the bar stock 120 jointly with the synchronous spindle 74. Hence the half-finished part $W_{h'}$ has then been transferred to the synchronous spindle 74 and so a new raw part $W_{r'}$ can be made available for machining in spindle positions I to V after the bar stock has been advanced.

After spindle drum 20 has been indexed one step, spindle $S_6$ arrives in spindle position VI. This situation is illustrated in FIG. 9b. In this position, spindle S6 holds a finished part $W_f$ ready and it is conveyed away. The half-finished part $W_{h'}$ temporarily stored in synchronous spindle 74 is now inserted into the "empty" spindle $S_6$ in such a way that it can be clamped with its second side $W_{h2'}$ in spindle $S_6$. Spindle $S_6$ can then pass through spindle stations I to V and the half-finished part $W_{h'}$ then arrives again in spindle position VI as finished part $W_f$ and can, therefore, be removed.

In summary, a raw part $W_{r'}$ is made available in spindles $S_1$, $S_3$ and $S_5$ in spindle position VI by advancing the bar stock 120 and after passing through spindle positions I to V it arrives again in spindle position VI, is removed from it as half-finished part $W_{h'}$ by being cut off by synchronous spindle 74, is temporarily stored in synchronous spindle 74 and then inserted again as half-finished part $W_{h'}$ into one of spindles $S_2$, $S_4$ and $S_6$ and, clamped with its second side $W_{h'2}$, passes through spindle positions I to V so as to arrive again as finished part $W_f$ in spindle position VI.

The individual method steps to be carried out in spindle position VI will now be explained in detail in the following FIGS. 10 to 12.

Once spindle $S_1$ appears in spindle position VI, it carries a workpiece $W_h$ which owing to the previous machining cycle in spindle positions I to V was provided, for example, with grooves 122 and bores 124 and represents a half-finished part which is, however, still connected to the bar stock 120 and on account of the collets 32 clamping the bar stock 120 is likewise still clamped in spindle $S_1$ (FIG. 10a). To cut off the half-finished workpiece $W'_h$, the synchronous spindle 74 arranged in its initial position in spaced relation to spindle $S_1$ is moved in the direction of an arrow 126 towards spindle $S_1$, to enable its chuck 76 to clamp workpiece $W'_h$ on the second side $W'_{h2}$ (FIG. 10b). After both spindle $S_1$ and synchronous spindle 74 have been made to rotate, the cutting-off of workpiece $W'_h$ can be carried out by means of the tool carriage VIa associated with spindle position VI and the tool 66 carried by it. After the cutting-off, workpiece $W'_h$ remains clamped in chuck 76 of synchronous spindle 74. Synchronous spindle 74 is then moved back in the direction of an arrow 128 into its initial position away from spindle $S_1$, and the bar stock 120 in spindle $S_1$ can be advanced during temporary release of collet 32 in the direction of synchronous spindle 74 to such an extent that this workpiece $W'_r$ representing a raw part is clamped in spindle $S_1$ and is available for the subsequent machining cycle in spindle positions I to V. Therefore, after six indexing steps of spindle drum 20, a half-finished workpiece $W'_h$ with grooves 122 and bores 124 arrives in spindle position VI.

Since a path of advance of the bar must be precisely fixed and measured for advance of the bar stock 120, it is advantageous for gripper $G_1$ to be driven in the path of advance of the bar to an appropriate distance in front of spindle $S_1$ and hence serve as delimiting stop for advance of the bar.

After indexing of spindle drum 20, spindle $S_1$ stands in spindle position I and spindle $S_6$ now in spindle position VI (FIG. 11a), and synchronous spindle 74 is still holding workpiece $W'_h$ representing a half-finished part clamped in its chuck 76. The spindle $S_1$ with the workpiece representing a raw part standing in spindle position I is now illustrated in dashed lines in FIG. 11a.

In this position, the workpiece gripping device 34 is swivelled into its position associated with spindle position VI and so double gripper 42 stands coaxially with spindle axis 26 and hence also with synchronous spindle 74.

Spindle $S_6$ carries a workpiece $W'_f$ clamped on the second side $W'_2$ which in the previous machining cycle in spindle positions I to V has been provided with additional grooves 126 and bores 128 and now represents the finished part. Transfer of the workpiece $W'_f$ representing a finished part and still clamped in spindle $S_6$ to workpiece gripper $G_1$ of double gripper 42 and also of the workpiece $W'_h$ representing a half-finished part and still clamped in synchronous spindle 74 to gripper $G_2$ is carried out during simultaneous displacement of workpiece gripping device 34 in the direction of its swivel axis 38 towards spindle $S_6$ and displacement of synchronous spindle 74 in the same direction so that gripper $G_1$ gets to grip the finished part $W'_f$ on the first side $W'_{f1}$ and gripper $G_2$ the half-finished part $W'_h$ likewise on the first side $W'_{h1}$ (FIG. 11b).

After grippers $G_1$ and $G_2$ are closed and chuck 30 of spindle $S_6$ and also chuck 76 of synchronous spindle 74 are opened, synchronous spindle 74 and workpiece gripping device 34 are moved away from spindle $S_6$ in the direction of an arrow 132 and so—as shown in FIG. 7c—synchronous spindle 74 is standing in its initial position and double gripper 42 between spindle $S_6$ and synchronous spindle 74.

After double gripper 42 is rotated about longitudinal axis 60 of arm 40 through 180 degrees, gripper $G_2$ faces spindle $S_6$ with the half-finished part $W'_h$ (FIG. 11d). Therefore, the half-finished part can be inserted into the free chuck 30 of spindle $S_6$ and clamped there (FIG. 11e) by displacement of double gripper 42 in the direction of arrow 134. After gripper $G_2$ is opened, workpiece gripping device 34 is again moved away from spindle $S_6$ in the direction of an arrow 136 to such an extent that double gripper 42 stands between spindle $S_6$ and synchronous spindle 74 (FIG. 11f).

Hence the half-finished part $W'_h$ is clamped in spindle $S_6$ and can now undergo a further machining cycle in spindle positions I to V and having gone through this machining cycle arrives in spindle position VI as finished part $W'_f$.

Now only the finished part $W'_f$ is held in gripper $G_1$ and can be deposited in one of the recesses 56 of workpiece transporting device 44 by workpiece gripping device 34 being swivelled about swivel axis 38 into the position associated with workpiece transporting device 44. Accordingly, in the case of the second embodiment, workpiece transporting device 44 merely serves to convey finished parts away and not to additionally feed raw parts.

Next, spindle drum 20 is indexed one step and so spindle $S_5$ then appears in spindle position VI (FIG. 12). Like spindle $S_1$, it carries a half-finished part produced in a previous machining cycle. The procedure carried out with it is then the same as with the half-finished part in spindle $S_1$, i.e., a cutting-off operation is carried out with the aid of synchronous spindle 74 and so the half-finished part $W'_h$ is then clamped on its second side $W'_{h2}$ in chuck 76 of synchronous spindle 74. Spindle $S_6$ now standing in spindle position I is illustrated supplementarily in dot-and-dash lines in FIG. 12 and, in like manner, double gripper 42 which in this position transfers the finished part to workpiece transporting device 44.

With reference to the above-described first and second embodiments of the inventive multiple-spindle automatic lathe, the feeding of raw workpieces $W_r$, the conveying away of finished workpieces $W_f$ and the changing over of half-finished workpieces $W_h$ from the spindles $S_1$, $S_3$, $S_5$, also referred to as first spindles, to the spindles $S_2$, $S_4$, $S_6$, also referred to as second spindles, with the clamping of the workpiece being simultaneously changed from the first side $W_1$ to the second side $W_2$, have been explained by way of example for both chucked parts and bar-type parts. However, no explanations were given about the machining operations in spindle positions I to V.

Since all of the spindle positions I to V are passed through by both the raw parts held in the first spindles during a machining cycle from the raw part to the half-finished part, and the half-finished parts held by the second spindles during the machining cycle from the half-finished part to the finished part, in accordance with the invention, spindle positions I to V are equipped with tools 66 and/or 70 in such a way that, as far as possible, machining of the workpieces can be carried out in each of the spindle positions I to V. This is easily possible with consistent use of the numerical control system of the multiple-spindle automatic lathes as both the tool carriages 62 and the tool holding devices 68 can be controlled in accordance with the part to be machined, depending on whether a first spindle or a second spindle is standing in the respective spindle position. Hence, for example, universal tools can be used in the machining of the raw part to the half-finished part for different cutting operations than in the machining of the half-finished part to the finished part.

As mentioned above, combination tools with two cutting edges can also be used. Hence one cutting edge can be utilized in the machining cycle from the raw part to the half-finished part and the other cutting edge in the machining cycle from the half-finished part to the finished part.

Of course, several tools may also be used simultaneously in each spindle position. For example, both tools 66 of tool carriages IIIa, IVa and Va and those of tool carriages IIIb, IVb and Vb may be used simultaneously in spindle positions III, IV and V in accordance with FIG. 2. It is also conceivable for tools 70 of the tool holding devices 68 associated with these spindle positions to likewise be used in addition.

This variety of uses of the tools in each of the spindle positions I to V facilitates, above all, in complicated cutting operations, the machining of workpieces W and hence results in extremely short machining times.

Finally, it should be mentioned that the tool carriage VIa associated with spindle position VI may, in addition to cutting off bar-type parts, also be used for additional machining operations on chucked parts or bar-type parts, for example, for a last finish-turning of the parts, since there is usually sufficient time between the respective indexing steps, the time between the individual indexing steps being limited by the longest machining time in one of spindle positions I to V. Hence those for the individual transfer steps of the parts between the spindles in spindle position VI and the gripper and between the synchronous spindle and the push-in device are of no significance.

With reference to the first embodiment of the inventive multiple-spindle automatic lathe, special operations in the machining of bar stock in the individual spindle positions I to VI are specified as examples for many machining operations, in order to explain again in detail the different or partly also identical machining of workpieces clamped in the first spindles $S_1$, $S_3$, $S_5$ or in the second spindles $S_2$, $S_4$, $S_6$. To this end, all workpieces occurring at the same point in time for machining in spindle positions I to VI are illustrated below one another in FIGS. 13a to 13f. In the left-hand vertical row, a first spindle is standing in spindle position I and, consequently, in spindle position II a second spindle, etc., whereas in the right-hand vertical row, a second spindle is standing in spindle position I and in spindle position II a first spindle. Passage of a raw part during machining up to the finished part, commencing at the top part of the left-hand column, is indicated by the thick black arrows.

As shown in FIG. 2, only tool carriage Ia with tool 66 which, in the instant case, has a flat cutting edge for cutting an annular groove 140 in a lateral area 142 of a cylindrical workpiece W representing a raw part, is associated with spindle position I. Simultaneously associated with spindle position I is the tool holding device 68 with tool 70 which carries a drill 144 for making a bore 146 in an end face 148 of the cylindrical workpiece $W'_r$ representing a raw part.

Hence in a machining of a raw part clamped in the first spindles $S_1$, $S_3$, $S_5$—as shown in FIG. 13a—in spindle position I, the annular groove 114 is cut and the bore 146 is made.

If, on the other hand, a workpiece which is already half-finished and clamped on the second side $W'_{f2}$ in the second spindles $S_2$, $S_4$, $S_6$ is awaiting machining in spindle position I, then only drill 144 is used. It serves to make a bore 150 in an end face 152 opposite end face 148.

Simultaneously with machining of a raw part in spindle position I, the machining of a half-finished part clamped in the second spindles is carried out in spindle position II (FIG. 13b) by the tool 66 which is a standard turning tool 153 which is held by tool carriage IIa and is used to turn a step 154 starting from end face 152. Also associated with this spindle position is a tool holding device 68 with a drill 156 which makes the bore 150 deeper from the end face 152. A workpiece $W'_r$ clamped in one of the first spindles in spindle position II is machined with the same tools 153, 156, in which case turning tool 153 serves to turn the lateral area 142 from end face 148 to annular groove 140 and drill 156 makes the bore 146 deeper.

In spindle position III (FIG. 13c) a widened turning tool 158 for cutting grooves is held by tool carriage IIIa and serves to widen the groove 140 on all workpieces W clamped in the first spindles. Simultaneously mounted in the tool holding device 68 associated with this spindle position is a turning tool 160 for internal machining, by means of which the bore 146 is widened. On the workpieces clamped in the second spindles, the turning tool 160 for internal machining is likewise used to widen bore 150 in a front region thereof. On the other hand, the turning tool 158 for cutting grooves is not used, but rather another turning tool 162 for cutting grooves which is held on tool carriage IIIb and serves to cut a groove 164 in step 154.

In spindle position IV (FIG. 13d) all of the workpieces $W'_h$ clamped in the second spindles are provided in the region of the step 154 with a thread which is made by a turning tool 166 for cutting threads which is held on tool carriage IVa. In this spindle position, turning tool 166 for cutting threads is likewise used on all workpieces $W'_h$ clamped in the first spindles, but, in addition to this, another turning tool 168 for cutting threads which is held on tool carriage IVb and also a turning tool 170 for internal machining which is mounted in the tool holding device 68 associated with this spindle position are used for cutting an annular groove in bore 146.

In spindle position V (FIG. 13e) a turning tool 172 for cutting grooves which is held on tool carriage Va and also a turning tool 174 for multiple use held on the tool holding device 68 associated with spindle position V are used on the workpieces $W'_r$ clamped in the first spindles. The last-mentioned turning tool 174 is also used on the workpieces $W'_h$ in the second spindles, whereas instead of the turning tool 172 for cutting grooves, a drill arranged on tool carriage Vb is used to make a bore.

Finally, in spindle position VI (FIG. 13f) half-finished parts clamped in the first spindles are merely cut off by the above-mentioned cut-off tool 178 held on tool spindle VIa. On the finished workpieces arriving in the second spindles in spindle position VI, no further machining is carried out in this spindle position.

Figure 14A:
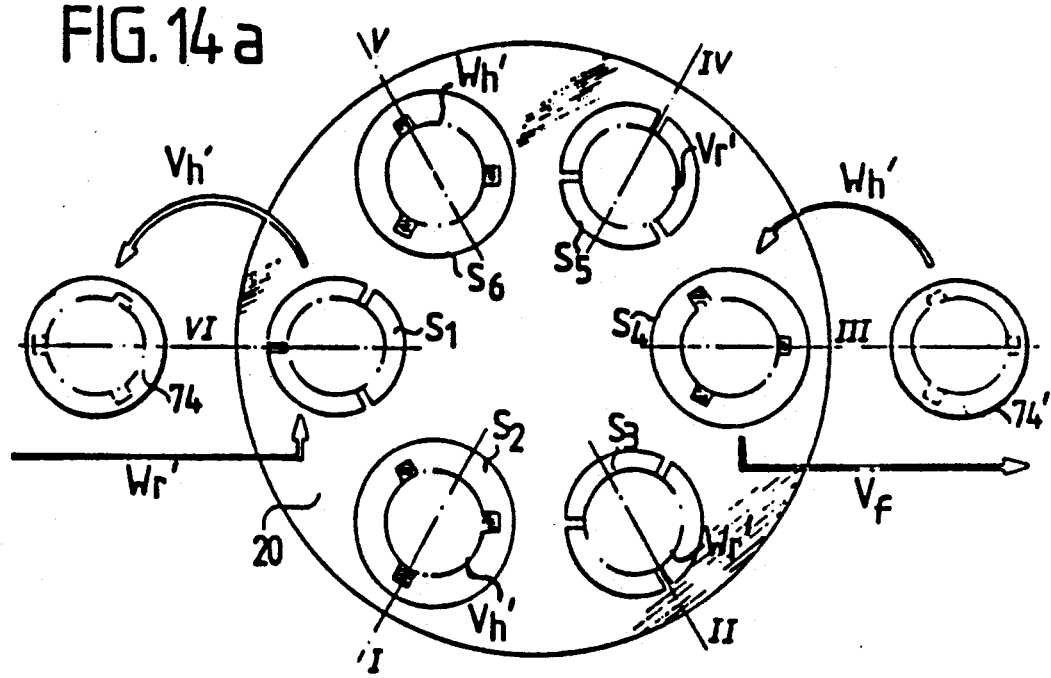
Figure 14B:
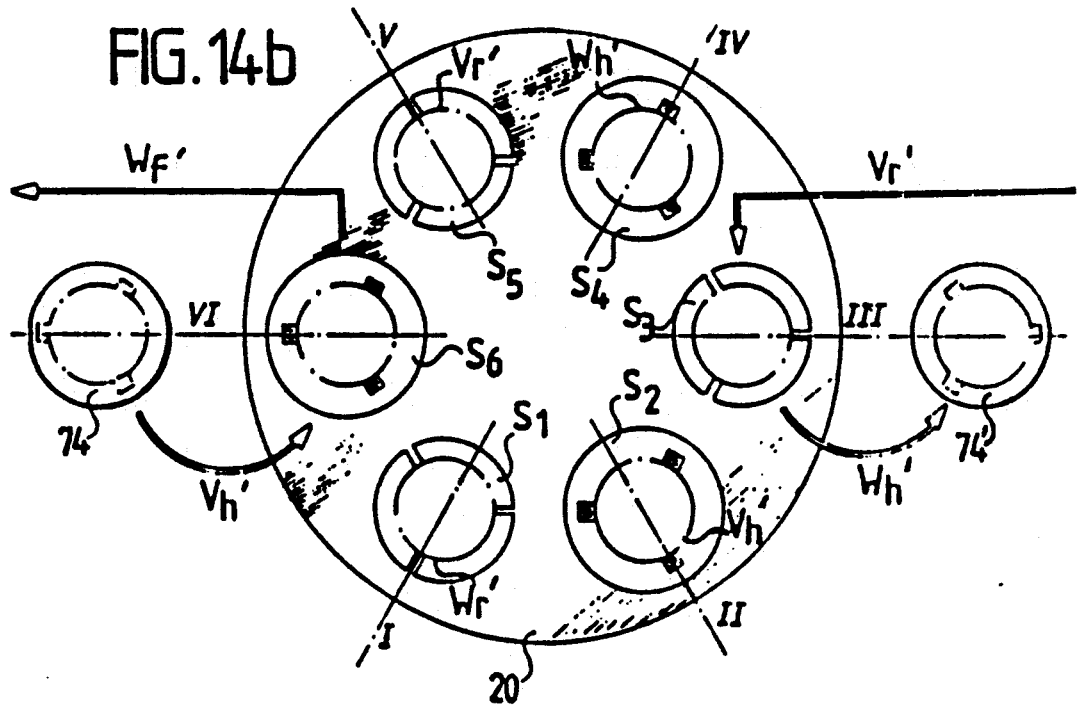

The performance of the inventive method on a multiple-spindle automatic lathe according to the second embodiment shown in FIG. 3 is described in FIGS. 14a and 14b and, exactly as in FIGS. 9a and 9b, machining of bar stock is carried out. To this end, in both spindle position VI and spindle position III, raw parts $W_r$ and $V_r$ are fed by advancing the bar stock in the collets and finished parts $W_f$ and $V_f$ are conveyed away.

The method is carried out as follows for workpieces W'. In spindle position VI, the bar stock is advanced in each of the spindles $S_1$, $S_3$ and $S_5$ and so a raw part W is available for machining. It is then made to pass through spindle positions I and II by indexing of spindle drum 20 and arrives as half-finished part $W_{h'}$ in spindle position III. There, it is cut off with the aid of synchronous spindle 74' and remains in this synchronous spindle 74' until the next indexing step. With the next indexing step, one of the spindles $S_2$, $S_4$ and $S_6$ arrives in spindle position III and so the half-finished part $W_{h'}$ can be inserted into one of these spindles by synchronous spindle 74', more particularly, in such a way that it is clamped on its second side $W_{h2'}$. In this clamped state, machining of the second side is possible in spindle positions IV and V. The half-finished part $W_{h'}$ then arrives as finished part $W_f$ in spindle position VI and is removed from the spindle in it and conveyed away.

Passage of a workpiece V, starting at spindle position III, is similar. There, bar stock is similarly advanced in one of the spindles $S_1$, $S_3$ and $S_5$ standing in spindle position III and so a raw part $V_r$ is available. It then passes through spindle positions IV and V and arrives in spindle position VI as half-finished part $V_{h'}$ (FIG. 14a), is cut off there with the aid of synchronous spindle 74 and remains in this synchronous spindle until after indexing of spindle drum 20 (FIG. 14b). The half-finished part $V_{h'}$ is then inserted into one of spindles $S_2$, $S_4$ and $S_6$ in such a way that it is clamped in it with its second side $W_{h2'}$ and can then pass through spindle positions I and II for completion of the machining. Hence it arrives again in spindle position III as finished part $V_f$ (FIG. 14a), is removed there and conveyed away.

Accordingly, performance of the inventive method with the second embodiment of the multiple-spindle automatic lathe resembles that in FIGS. 9a and 9b, with the difference that the changeover of the respective half-finished part $W_{h'}$ and $V_{h'}$ is not carried out in spindle position VI, III in which it is fed, but rather in the respective opposite spindle position.

As mentioned above, to enable gripper 61 to be advantageously used as delimiting stop for advance of the bar, as shown in FIG. 15, its inside jaw surfaces 210 serve as stop surfaces for the end face 212 of the bar stock and, in addition, there protrudes between these a feeler 214 of a sensor 216 beyond the plane formed by the inside jaw surfaces. Hence when the end face 212 strikes the stop surfaces 210, the sensor 216 is actuated by the feeler and reports this to a control system which can, therefore, recognize the presence of bar stock.

A third embodiment of the inventive multiple-spindle automatic lathe, illustrated in FIG. 16, differs from the first embodiment only in the way in which the double gripper 42, designated 42" in FIG. 16, is designed. This double gripper 42" is provided, in particular, for the purpose of gripping in the radial direction workpieces Z in the form of shaft-type parts approximately in a central region thereof. In this respect it differs from the double grippers 42 and 42' described so far, as these gripped the workpieces at the front or end face and are, therefore, to be referred to as axial grippers.

The double gripper 42" is preferably arranged relative to its swivel axis 38 in such a way that the workpieces Z held in grippers $G_1$ or $G_2$ cut the swivel circle 46 with their longitudinal axes 200, and so without a change in the radial spacing of double gripper 42" from swivel axis 38, each of the workpieces Z can be aligned coaxially with the spindle axis 26 standing in spindle position VI by mere swivelling of double gripper 42" about swivel axis 38.

The multiple-spindle automatic lathe according to the second embodiment operates, in principle, in exactly the same way as the multiple-spindle automatic lathe according to the first embodiment illustrated in FIGS. 5 to 7, with the only difference that after rotation of the double gripper illustrated from FIG. 5c to FIG. 5d, the half-finished part $Z_h$ is already reversed and stands available in a position in which it can be inserted into the spindle which after indexing is standing in spindle position VI. Hence insertion of the half-finished part into this second spindle in accordance with FIG. 6d can be carried out not by push-in device 74, but by gripper 42".

The method will now be explained briefly with reference to the sequence in accordance with FIGS. 5 to 7 which has already been described in detail. Herein only the differences from the first embodiment will be set forth.

The illustration in FIG. 16 corresponds to the situation according to FIG. 5a. The workpiece gripper 42" is swivelled to such an extent that gripper $G_2$ can grip the half-finished part $Z_h$ clamped in spindle $S_1$ in spindle position VI and remove it from it. Simultaneously, double gripper 42" has already gripped the raw part $Z_r$ in gripper $G_1$. After the half-finished part $Z_h$ has been removed from spindle $S_1$, gripper 42" rotates through 180 degrees about the longitudinal axis 60 of arm 40, as in the first embodiment in FIG. 5c. Hence the raw part $Z_r$ is already aligned coaxially with spindle $S_1$ and can be inserted into it in analogy with FIG. 5e. After insertion of raw part $Z_r$, the spindle drum is indexed, and so spindle $S_6$ carrying a finished part $Z_f$ is now standing in spindle position VI in analogy with FIG. 6a. The now empty gripper $G_1$ is already aligned coaxially with the spindle $S_6$ now standing in spindle position VI, and so the finished part $Z_f$ can be gripped in analogy with FIG. 6b and removed from spindle $S_6$.

Finally, gripper 42" is to be swivelled through such an angle that the half-finished part $Z_h$ held in gripper $G_2$ and already reversed is aligned coaxially with spindle $S_6$ and can subsequently be transferred in analogy with FIG. 6d. As mentioned above, the transfer is not carried out by the push-in device 74 additionally required in the first embodiment, but directly by gripper $G_2$. The finished part $Z_f$ can then be conveyed out and deposited on workpiece transporting device 44 in analogy with the first embodiment.

What is claimed is:

1. Multiple-spindle automatic machine tool for machining both sides of workpieces, comprising:

a machine housing;

a working area within said machine housing;

a spindle drum comprising several spindles, said spindles facing said working area and having spindle axes which are arranged at equal angular spacings around a drum axis, said spindles being positionable in different spindle positions fixedly arranged with respect to said machine housing by rotating said spindle drum, said spindle drum being indexable in single steps for positioning each spindle in the subsequent spindle position, said spindles being designed as successive first and second spindles for clamping the workpieces on a first or second clamping side, respectively, at least one of said spindle positions being selected to be used for feeding of raw workpieces to said spindles, removal of a finished workpiece from said spindles and changing over a half-finished workpiece from a first spindle to a second spindle by turning its clamping side, said respective spindle in said selected spindle position being a selected spindle;

at least one feeding means for delivering raw workpieces to said selected spindle position;

at least one conveying away means for conveying finished workpieces away from said selected spindle position;

at least one workpiece holding device facing said working area and being arranged opposite said selected spindle in said at least one selected spindle position;

at least one workpiece gripping device being movable into a workpiece gripping position facing selected spindle in said at least one selected spindle position for feeding or removing workpieces from said selected spindle, and into a workpiece changing position facing said workpiece holding device for exchanging said half-finished workpiece with said workpiece holding device; and means for controlling said machine tool, comprising:

loading mode means for feeding a raw workpiece to said one of said first spindles in said at least one selected spindle position;

changing over mode means for removing a half-finished workpiece from said first spindle in said at least one selected spindle position and for turning said workpiece around from said first clamping side to said second clamping side with said workpiece gripping device in cooperation with said workpiece holding device, said changing over mode means further for indexing said spindle drum by bringing one of said second spindles into said at least one selected spindle position and by reinserting said half-finished workpiece with said second clamping side in said second spindle in at least one selected spindle position; and unloading mode means for conveying said finished workpiece away from said second spindle in said at least one selected spindle position.

2. Machine tool according to claim 1, wherein said workpiece gripping device comprises a workpiece gripper rotatable about an axis extending transversely to the spindle axis.

3. Machine tool according to claim 2, wherein a working area is so designed that the workpiece gripper is rotatable with at least one workpiece gripped in it about said axis extending transversely to said spindle axis.

4. Machine tool according to claim 2, wherein said workpiece gripping device comprises a double gripper.

5. Machine tool according to claim 1, wherein said workpiece gripping device is immobilizable in at least two positions having the gripped workpiece oriented parallel to the spindle axis and arranged in rotated relation to each other through a rotary angle of 180 degrees with respect to said axis extending transversely to said spindle axis.

6. Machine tool according to claim 5, wherein said workpiece gripping device comprises an arm which carries a workpiece gripper and is rotatable about its longitudinal axis.

7. Machine tool according to claim 5, wherein said workpiece gripping device is movable parallel to the axis of rotation of said selected spindle.

8. Machine tool according to claim 1, wherein said workpiece gripping device is pivotable about a swivel axis approximately parallel to said selected spindle axis.

9. Machine tool according to claim 1, wherein said workpiece holding device is arranged coaxially with said selected spindle.

10. Machine tool according to claim 9, wherein the workpiece holding device is movable back and forth in the direction towards said selected spindle.

11. Machine tool according to claim 1, wherein said workpiece gripping device represents said conveying away means and said unloading mode means controls said workpiece gripping device for transferring said finished workpiece from said second spindle in said at least one selected spindle position to a removing position.

12. Machine tool according to claim 1, wherein said workpiece gripping device represents said feeding means and said loading mode means controls said workpiece gripping device for transferring a raw workpiece from a feeding position to said first spindle in said at least one selected spindle position.

13. Machine tool according to claim 1, wherein said feeding means is designed for feeding a raw workpiece coaxially with said first spindles.

14. Machine tool according to claim 13, wherein said feeding means is a bar stock feeding means for feeding said raw workpiece in the form of a bar.

15. Machine tool according to claim 14, wherein said changing over mode means comprise cut-off mode means for controlling a cutting off of said half-finished workpiece in said selected spindle position for removing said half-finished workpiece from said first spindle in said at least one selected spindle position.

16. Machine tool according to claim 15, wherein the workpiece holding device is a synchronous spindle arranged coaxially with said selected spindle.

17. Machine tool according to claim 16, wherein said synchronous spindle is movable back and forth in the direction towards said selected spindle.

18. Machine tool according to claim 13, wherein said workpiece gripping device represents said conveying away means and said unloading mode means controls said workpiece gripping device for transferring said finished workpiece from said second spindle in said at least one selected spindle position to a removing position.

19. Multiple-spindle automatic machine tool for machining both sides of workpieces, comprising:
a machine housing;
a working area within said machine housing;
a spindle drum comprising several spindles, said spindles facing said working area and having spindle axes which are arranged at equal angular spacings around a drum axis, said spindles being positionable in different spindle positions fixedly arranged with respect to said machine housing by rotating said spindle drum, said spindle drum being indexable in single steps for positioning each spindle in the subsequent spindle position, said spindles being designed as successive first and second spindles for clamping the workpieces on a first or second clamping side, respectively,
at least one of said spindle positions being selected to be used for feeding of raw workpieces to said spindles, removal of finished workpieces from said spindles and changing over of half-finished workpieces from a first spindle to a second spindle, said respective spindle in said selected spindle position being a selected spindle;
at least one feeding means for delivering raw workpieces to said selected spindle position;
at least one conveying away means for conveying finished workpieces away from said selected spindle position;
at least one workpiece gripping device, said gripping device being rotatable about an axis perpendicular to said spindle axis of said selected spindle through an angle of rotation of 180 degrees for changing the clamping side of the workpiece, said gripping device being further movable into a workpiece gripping position facing said selected spindle in said selected spindle position for feeding or removing workpieces from said selected spindle;
means for controlling said machine tool, comprising:
loading mode means for feeding a raw workpiece to said one of said first spindles in said at least one selected spindle position;
changing over mode means using said workpiece gripping device for removing a half-finished workpiece from said first spindle in said at least one selected spindle position, for turning said workpiece round from said first clamping side to said second clamping side, for indexing said spindle drum bringing one of said second spindles into said at least one selected spindle position, and for reinserting said half-finished workpiece with said second clamping side in said second spindle in said at least one selected spindle position; and
unloading mode means for conveying said finished workpiece away from said second spindle in said at least one selected spindle position.

20. Machine tool according to claim 19, wherein said working area is so designed that the workpiece gripper is rotatable with at least one workpiece gripped in it about the axis extending transversely to the spindle axis.

21. Machine tool according to claim 19, wherein said workpiece gripping device comprises an arm which carries the workpiece gripping device and is rotatable about its longitudinal axis.

22. Machine tool according to claim 19, wherein said workpiece gripping device is a double gripper.

23. Machine tool according to claim 19, wherein said workpiece gripping device is movable parallel to axes of rotation of the spindles.

24. Machine tool according to claim 19, wherein said workpiece gripping device is pivotable about a swivel axis approximately parallel to the spindle axis.

25. Machine tool according to claim 19, wherein said workpiece gripping device is a radial gripper.

26. Machine tool according to claim 19, wherein said workpiece gripping device represents said conveying away means and said unloading mode means controls said workpiece gripping device for transferring said finished workpiece from said second spindle in said at least one selected spindle position to a removing position.

27. Machine tool according to claim 19, wherein said workpiece gripping device represents said feeding means and said loading mode means controls said workpiece gripping device for transferring a raw workpiece from a feeding position to said first spindle in said at least one selected spindle position.

28. Machine tool according to claim 19, wherein said feeding means is designed for feeding a raw workpiece coaxially with said first spindles.

29. Machine tool according to claim 28, wherein said workpiece gripping device represents said conveying away means and said unloading mode means controls said workpiece gripping device for transferring said finished workpiece from said second spindle in said at least one selected spindle position to a removing position.

30. Machine tool according to claim 28, wherein said feeding means is a bar stock feeding means for feeding said raw workpiece in the form of a bar.

31. Machine tool according to claim 30, wherein said changing over mode means comprise cut-off mode means for controlling a cutting off of said half-finished workpiece in said selected spindle position for removing said half-finished workpiece from said first spindle in said at least one selected spindle position.

32. Machine tool according to claim 30, wherein said workpiece gripping device comprises a stop surface serving as delimitation for advance of bar stock.

33. Machine tool according to claim 32, wherein said workpiece gripping device is provided with a sensor which reports contact with the stop surface.

34. Multiple-spindle automatic machine tool for machining both sides of workpieces, comprising:

a machine housing;

a working area within said machine housing;

a spindle drum comprising several spindles, said spindles facing said working area and having spindle axes which are parallel to each other and are arranged at equal angular spacings around a drum axis, said spindles being positionable in different spindle positions fixedly arranged with respect to said machine housing by rotting said spindle drum, said spindle drum being indexable in single steps for positioning each spindle in the subsequent spindle position, said spindles being designed as successive first and second spindles for clamping the workpieces on a first or second clamping side, respectively, two of said spindle positions being selected, each being used for feeding of raw workpieces to said spindles, removal of finished workpieces from said spindles and changing over of half-finished workpieces from a first spindle to a second spindle, said respective spindle in said selected spindle position being a selected spindle;

a feeding means for being associated with said selected spindle positions for delivering raw workpieces to each of said selected spindle positions;

a conveying away means being associated with said selected spindle positions for conveying finished workpieces away from each of said selected spindle positions;

a workpiece gripping device being associated with said selected spindle positions being movable into a workpiece gripping position facing said selected spindle in said selected spindle position for feeding or removing workpieces from said selected spindle, and into a workpiece changing position for changing the clamping side of said workpiece; and means for controlling said machine tool, comprising:

loading mode means for each of said selected spindle positions for feeding a raw workpiece to said one of said first spindles in said at least one selected spindle position;

changing over mode means for each of said selected spindle positions by removing a half-finished workpiece from said first spindle in said at least one selected spindle position, by turning said workpiece round from said first clamping side to said second clamping side, by indexing said spindle drum bringing one of said second spindles into said at least one selected spindle position, and by inserting said half-finished workpiece with said second clamping side in said second spindle in said at least one selected spindle position; and unloading mode means for each of said selected spindle positions conveying a finished workpiece away from said second spindle in said at least one selected spindle position.

35. Machine tool according to claim 34, wherein said selected spindle positions are arranged opposite each other.

36. Machine tool according to claim 34 further comprising at least one workpiece holding device associated with each of said selected spindle positions and facing said working area and being arranged opposite said selected spindle in said respective selected spindle position and having each of said workpiece gripping devices designed to be movable into a workpiece changing position facing said respective workpiece holding device for exchanging a workpiece with said respective workpiece holding device.

37. Machine tool according to claim 34, wherein each workpiece gripping device comprises a workpiece gripper rotatable about an axis extending transversely to the spindle axis.

38. Machine tool according to claim 37, wherein said workpiece gripper is a double gripper.

39. Machine tool according to claim 34, wherein each workpiece gripping device is movable parallel to axes of rotation of said selected spindles.

40. Machine tool according to claim 36, wherein each workpiece holding device is arranged coaxially with the selected spindle.

41. Machine tool according to claim 40, wherein said workpiece holding device is movable to and fro in the direction towards the associated spindle.

42. Machine tool according to claim 34, wherein said workpiece gripping device represents said conveying away means and said loading mode means controls said workpiece gripping device for transferring said finished workpiece from said second spindle in said at least one selected spindle position to a removing position.

43. Machine tool according to claim 34, wherein said workpiece gripping device represents said feeding means and said loading mode means controls said workpiece gripping device for transferring a raw workpiece from a feeding position to said first spindle in said at least one selected spindle position.

44. Machine tool according to claim 34, wherein said feeding means is designed for feeding a raw workpiece coaxially with said first spindles.

45. Machine tool according to claim 34, wherein said feeding means is a bar stock feeding means for feeding said raw workpiece in the form of a bar.

46. Machine tool according to claim 45, wherein said changing over mode means comprise cut-off mode means for controlling a cutting off of said half-finished workpiece in said selected spindle position for removing said half-finished workpiece from said first spindle in said at least one selected spindle position.

47. Machine tool according to claim 46, wherein said workpiece holding device is a synchronous spindle.

48. Machine tool according to claim 44, wherein said workpiece gripping device represent said conveying away means and said unloading mode means controls said workpiece gripping device for transferring said finished workpiece from said second spindle in said at least one selected spindle position to a removing position.

* * * * *

UNITED STATES PATENT AND TRADEMARK OFFICE
CERTIFICATE OF CORRECTION

PATENT NO. : 5,083,485

DATED : January 28, 1992

INVENTOR(S) : Helmut F. Link et al.

It is certified that error appears in the above-identified patent and that said Letters Patent is hereby corrected as shown below:

In Claim 34, column 31, line 9, delete "rotting" and replace with -- rotating --.

Signed and Sealed this

Twentieth Day of April, 1993

Attest:

MICHAEL K. KIRK

Attesting Officer     Acting Commissioner of Patents and Trademarks